US007872228B1

(12) United States Patent
Kim et al.

(10) Patent No.: US 7,872,228 B1
(45) Date of Patent: Jan. 18, 2011

(54) STACKED WELL ION TRAP

(75) Inventors: Taeman Kim, Westford, MA (US); Melvin A. Park, Billerica, MA (US)

(73) Assignee: Bruker Daltonics, Inc., Billerica, MA (US)

( * ) Notice: Subject to any disclaimer, the term of this patent is extended or adjusted under 35 U.S.C. 154(b) by 229 days.

(21) Appl. No.: 12/141,610

(22) Filed: Jun. 18, 2008

(51) Int. Cl.
*B01D 59/44* (2006.01)

(52) U.S. Cl. ........................ 250/292; 250/287; 250/288

(58) Field of Classification Search ....................... None
See application file for complete search history.

(56) References Cited

U.S. PATENT DOCUMENTS

| | | | | |
|---|---|---|---|---|
| 3,065,640 | A | 11/1962 | Langmuir et al. | |
| 5,965,884 | A | 10/1999 | Laiko et al. | |
| 6,177,668 | B1 | 1/2001 | Hager | |
| 6,838,666 | B2 | 1/2005 | Ouyang et al. | |
| 6,906,324 | B1 * | 6/2005 | Wang et al. | 250/292 |
| 6,911,650 | B1 * | 6/2005 | Park | 250/292 |
| 6,949,743 | B1 | 9/2005 | Schwartz | |
| 6,956,205 | B2 * | 10/2005 | Park | 250/288 |
| 7,126,118 | B2 * | 10/2006 | Park | 250/292 |
| 7,449,686 | B2 * | 11/2008 | Wang et al. | 250/292 |
| 7,459,693 | B2 * | 12/2008 | Park et al. | 250/423 R |
| 7,495,212 | B2 * | 2/2009 | Kim et al. | 250/292 |
| 7,514,677 | B2 * | 4/2009 | Choi et al. | 250/292 |
| 2004/0195503 | A1 * | 10/2004 | Kim et al. | 250/288 |
| 2004/0211897 | A1 * | 10/2004 | Kim et al. | 250/288 |
| 2006/0016981 | A1 * | 1/2006 | Park | 250/288 |
| 2006/0108520 | A1 * | 5/2006 | Park et al. | 250/287 |
| 2007/0278399 | A1 * | 12/2007 | Kim et al. | 250/288 |
| 2008/0116373 | A1 * | 5/2008 | Choi et al. | 250/292 |
| 2009/0032700 | A1 * | 2/2009 | Park et al. | 250/282 |
| 2009/0127455 | A1 * | 5/2009 | Kim et al. | 250/288 |

OTHER PUBLICATIONS

Bonner, et al., "The Cylindrical Ion Trap, Part I. General Introduction," International Journal of Mass Spectrometry and Ion Physics, vol. 24, pp. 255-269, 1977, Elsevier Scientific Publication Company, Amsterdam, The Netherlands.

Chernushevich, et al., "Orthogonal Injection TOFMS," Analytical Chemistry News and Features, 71 (13) Jul. 1, 1999, pp. 452-461.

Cunningham, et al., "High Amplitude Short Time Excitation: A Method to Form and Detect Low Mass Product Ions in a Quadrupole Ion Trap Mass Spectrometer," Journal of American Society for Mass Spectrometry, vol. 17, pp. 81-84, 2006, Elsevier Inc.

(Continued)

*Primary Examiner*—David A Vanore
(74) *Attorney, Agent, or Firm*—Law Offices of Paul E. Kudirka

(57) ABSTRACT

In an apparatus for performing a mass spectrometric analysis of a sample, a plurality of electrodes are positioned and driven by RF potentials to form a plurality of adjacent pseudopotential wells. Ions may be manipulated, reacted, analyzed, and ejected from the apparatus in a manner similar to conventional ion traps. In addition, selected ions or groups of ions may be passed from one pseudopotential well to another pseudopotential well without ion losses due to physical obstructions. The apparatus may be used alone or in conjunction with other mass analyzers to produce mass spectra from analyte ions.

20 Claims, 11 Drawing Sheets

OTHER PUBLICATIONS

Dole, et al., “Molecular Beams of Macroions,” Journal of Chemical Physics, vol. 49, No. 5, pp. 2240-2249, 1968.

Karas, et al., “Laser Desorption Ionization of Proteins with Molecular Masses Exceeding 10 000 Daltons,” American Chemical Society, vol. 60, No. 20, pp. 2299-2301, 1988, Germany.

Ouyang et al., “Rectilinear Ion Trap: Concepts, Calculations and Analytical Performance of a New Mass Analyzer,” Analytical Chemistry, vol. 76, No, 16, pp. 4595-4605, 2004, American Chemical Society.

Polfer, et al., “Electron Capture Dissociation of Polypeptides Using a 3 Tesla Fourier Transform Ion Cyclotron Resonance Mass Spectrometer,” Rapid Communications in Mass Spectrometry, vol. 16, pp. 936-943, 2002, John Wiley & Sons, Ltd.

Schwartz, et al., “Focus: Quadrupole Ion Traps; A Two-Dimensional Quadrupole Ion Trap Mass Spectrometer,” Journal of Americal Society for Mass Spectrometry, vol. 13, pp. 659-669, 2002, Elsevier Science Inc.

Song, et al., “Novel Linear Ion Trap Mass Analyzer Composed of Four Planar Electrodes,” Journal of American Society for Mass Spectrometry, vol. 17, pp. 631-639, 2006, Elsevier Inc.

Swaney, et al., “Supplemental Activation Method For High-Efficiency Electron-Transfer Dissociation of Doubly Protonated Peptide Precursors,” Analytical Chemistry, vol. 79, No. 2, pp. 477-485, 2007, American Chemical Society.

Tabet, et al., “Laser Desorption Time-of-Flight Mass Spectrometry of high Mass Molecules,” Analytical Chemistry, vol. 56, No. 9, pp. 1662-1667, 1984.

Tanaka, et al., “Protein and Polymer Analyses up to m/z 100 000 by Laser Ionization Time-of-Flight Mass Spectrometry,” Rapid Communications in Mass Spectrometry, vol. 2, No. 8, pp. 151-153, 1988, Heyden & Son Limited.

Torgerson, et al., “New Approach to the Mass Spectroscopy of Non-Volatile Compounds,” Biochemcial and Biophysical Research Communications, vol. 60, No. 2, pp. 616-621, 1974, Academic Press, Inc.

Vekey, et al., “Electron Capture-Induced Decomposition (ECID): A New Method to Study Electron-Capture Collisions,” International Journal of Mass Spectrometry and Ion Processes, vol. 70, pp. 277-300, 1986, Elsevier Science Publishers B.V., Amersterdam, The Netherlands.

Wuerker, et al., “Electrodynamic Containment of Charged Particles by Three-Phase Voltages,” Journal of Applied Physics, vol. 30, pp. 341-342, 1959.

Xia, et al., “Implementation of Ion/Ion Reactions in a Quadrupole/Time-of-Flight Tandem Mass Spectrometer,” Analytical Chemistry, vol. 78, No. 12, pp. 4146-4154, 2006, American Chemical Society.

* cited by examiner

52

98

100

STACKED WELL ION TRAP

BACKGROUND

The present invention relates to methods for the analysis of samples by mass spectrometry. The apparatus and methods for ion transport and analysis described herein are enhancements of the techniques referred to in the literature relating to mass spectrometry—an important tool in the analysis of a wide range of chemical compounds. Specifically, mass spectrometers can be used to determine the molecular weight of sample compounds. The analysis of samples by mass spectrometry consists of three main steps—formation of gas phase ions from sample material, mass analysis of the ions to separate the ions from one another according to ion mass, and detection of the ions. A variety of means and methods exist in the field of mass spectrometry to perform each of these three functions. The particular combination of the means and methods used in a given mass spectrometer determine the characteristics of that instrument.

To mass analyze ions, for example, one might use magnetic (B) or electrostatic (E) analysis, wherein ions passing through a magnetic or electrostatic field will follow a curved path. In a magnetic field, the curvature of the path will be indicative of the momentum-to-charge ratio of the ion. In an electrostatic field, the curvature of the path will be indicative of the energy-to-charge ratio of the ion. If magnetic and electrostatic analyzers are used consecutively, then both the momentum-to-charge and energy-to-charge ratios of the ions will be known and the mass of the ion will thereby be determined. Other mass analyzers are the quadrupole (Q), the ion cyclotron resonance (ICR), the time-of-flight (TOF), the Orbitrap, and the quadrupole ion trap analyzers. The analyzer used in conjunction with the method described here may be any of a variety of these.

Before mass analysis can begin, gas phase ions must be formed from a sample material. If the sample material is sufficiently volatile, ions may be formed by electron ionization (EI) or chemical ionization (CI) of the gas phase sample molecules. Alternatively, for solid samples (e.g., semiconductors, or crystallized materials), ions can be formed by desorption and ionization of sample molecules by bombardment with high energy particles. Further, Secondary Ion Mass Spectrometry (SIMS), for example, uses keV ions to desorb and ionize sample material. In the SIMS process a large amount of energy is deposited in the analyte molecules, resulting in the fragmentation of fragile molecules. This fragmentation is undesirable in that information regarding the original composition of the sample (e.g., the molecular weight of sample molecules) will be lost.

For more labile, fragile molecules, other ionization methods now exist. The plasma desorption (PD) technique was introduced by Macfarlane et al. (D. F. Torgerson, R. P. Skowronski, and R. D. Macfarlane, *Biochem. Biophys. Res Commoun.* 60 (1974) 616)("McFarlane"). Macfarlane discovered that the impact of high energy (MeV) ions on a surface, like SIMS would cause desorption and ionization of small analyte molecules. However, unlike SIMS, the PD process also results in the desorption of larger, more labile species (e.g., insulin and other protein molecules).

Additionally, lasers have been used in a similar manner to induce desorption of biological or other labile molecules. See, for example, Cotter et al. (R. B. VanBreeman, M. Snow, R. J. Cotter, *Int. J. Mass Spectrom. Ion Phys.* 49 (1983) 35; Tabet, J. C.; Cotter, R. J., Tabet, J. C., *Anal. Chem.* 56 (1984) 1662; or R. J. Cotter et al., *Anal. Instrument.* 16 (1987) 93). Cotter modified a CVC 2000 time-of-flight mass spectrometer for infrared laser desorption of non-volatile biomolecules, using a Tachisto (Needham, Mass.) model 215G pulsed carbon dioxide laser. The plasma or laser desorption and ionization of labile molecules relies on the deposition of little or no energy in the analyte molecules of interest.

The use of lasers to desorb and ionize labile molecules intact was enhanced by the introduction of matrix assisted laser desorption ionization (MALDI) (K. Tanaka, H. Waki, Y. Ido, S. Akita, Y. Yoshida, T. Yoshica, *Rapid Commun. Mass Spectrom.* 2 (1988) 151 and M. Karas, F. Hillenkamp, *Anal. Chem.* 60 (1988) 2299). In the MALDI process, an analyte is dissolved in a solid, organic matrix. Laser light of a wavelength that is absorbed by the solid matrix but not by the analyte is used to excite the sample. Thus, the matrix is excited directly by the laser, and the excited matrix sublimes into the gas phase carrying with it the analyte molecules. The analyte molecules are then ionized by proton, electron, or cation transfer from the matrix molecules to the analyte molecules. This process (i.e., MALDI) is typically used in conjunction with time-of-flight mass spectrometry (TOFMS) and can be used to measure the molecular weights of proteins in excess of 100,000 Daltons.

Further, Atmospheric Pressure Ionization (API) includes a number of ion production means and methods. Typically, analyte ions are produced from liquid solution at atmospheric pressure. One of the more widely used methods, known as electrospray ionization (ESI), was first suggested by Dole et al. (M. Dole, L. L. Mack, R. L. Hines, R. C. Mobley, L. D. Ferguson, M. B. Alice, *J. Chem. Phys.* 49, 2240, 1968). In the electrospray technique, analyte is dissolved in a liquid solution and sprayed from a needle. The spray is induced by the application of a potential difference between the needle and a counter electrode. The spray results in the formation of fine, charged droplets of solution containing analyte molecules. In the gas phase, the solvent evaporates leaving behind charged, gas phase, analyte ions. This method allows for very large ions to be formed. Ions as large as 1 MDa have been detected by ESI in conjunction with mass spectrometry (ESMS).

In addition to ESI, many other ion production methods might be used at atmospheric or elevated pressure. For example, MALDI has recently been adapted by Laiko et al. to work at atmospheric pressure (Victor Laiko and Alma Burlingame, "Atmospheric Pressure Matrix Assisted Laser Desorption", U.S. Pat. No. 5,965,884, and Atmospheric Pressure Matrix Assisted Laser Desorption Ionization, poster #1121, 4$^{th}$ International Symposium on Mass Spectrometry in the Health and Life Sciences, San Francisco, Aug. 25-29, 1998) and by Standing et al. at elevated pressures (Time of Flight Mass Spectrometry of Biomolecules with Orthogonal Injection+Collisional Cooling, poster #1272, 4$^{th}$ International Symposium on Mass Spectrometry in the Health and Life Sciences, San Francisco, Aug. 25-29, 1998; and Orthogonal Injection TOFMS *Anal. Chem.* 71(13), 452A (1999)). The benefit of adapting ion sources in this manner is that the ion optics (i.e., the electrode structure and operation) in the mass analyzer and mass spectral results obtained are largely independent of the ion production method used.

Many different types of analyzers have been used to mass analyze sample ions. One important type of mass analyzer is the quadrupole mass analyzer. There are also several types of quadrupole analyzers. Among them are the quadrupole filter, the quadrupole trap—a.k.a. the Paul trap—the cylindrical ion trap, linear ion trap, and the rectilinear ion trap.

The conventional quadrupole filter consists of four rods equally spaced at a predetermined radius around a central axis. A radio frequency (RF)—e.g. a 1 MHz sine wave—potential is applied between the rods. The potential on adjacent rods is 180° out of phase. Rods on opposite sides of the quadrupole axis are electrically connected—i.e. the quadrupole is formed as two pairs of rods. The quadrupole has an entrance end and an exit end. Ions to be filtered are injected into the entrance end of the quadrupole. These ions travel along the axis of the quadrupole to the exit end. The RF potential applied between the rods will tend to confine the ions radially. Applying a DC as well as an RF potential between the pairs of rods will cause ions of only a limited mass range to be transmitted through the quadrupole. Ions outside this mass range will be filtered away and will not reach the exit end.

In a quadrupole mass analyzer, ions transmitted through the quadrupole are detected as ion signals via a channeltron detector. To produce a mass spectrum the quadrupole parameters are "scanned" and the ion signals are recorded as a function of the scan parameters. In the so-called "mass-selective stability" mode of operation the amplitudes of RF and DC voltages applied to the quadrupole rods are ramped at a constant RF/DC ratio. At each point in the ramp, ions of nominally a single m/z have a stable trajectory and are transmitted. Recording the ion signal as a function of the ramp thus yields a mass spectrum.

The Paul ion trap (a.k.a. quadrupole ion trap) is based on a similar principle and construction as the quadrupole filter, however, as the name implies, ions are trapped in the Paul trap before they are mass analyzed. Also unlike the quadrupole filter, the Paul trap is cylindrically symmetric. The Paul trap is constructed using three rotationally symmetric hyperbolic electrodes. Two "end cap" electrodes are placed one on either side of a central "ring electrode". Applying an RF potential between the ring electrode and the end caps forms a quadrupolar pseudopotential well in the interior volume of the trap. In a typical analysis ions enter the trap through apertures in one of the end caps, lose kinetic energy via collisions with gas in the trap and thereby become trapped in the pseudopotential well.

The quadrupole ion trap is typically operated in one of two modes—the mass selective instability mode or the resonance ejection mode. The mass selective instability mode differs from the mass selective stability mode described above in that ions are detected when their trajectories become unstable. Initially, a group of analyte ions is trapped near the center of the quadrupole ion trap. The ions will oscillate about the center of the trap with a frequency related to the m/z of the ion. When performing a mass selective instability scan, the amplitude of the RF potential applied to the ring electrode is ramped to higher values. At each point in the RF ramp, ions below a given m/z have unstable trajectory and are ejected from the trap. The given "cutoff" m/z is a linear function of the RF amplitude. Thus, recording the ion signal as a function of the ramp yields a mass spectrum.

A similar principle is applied when operating in the resonance ejection mode. However, in resonance ejection mode, an additional AC potential is applied between the end cap electrodes. The ions are excited not only by the RF as in selected ion instability mode but also by the supplemental AC. Therefore the ions are ejected more quickly from the trap—i.e. earlier in the ramp. Because ions are ejected from the trap at lower RF amplitudes, experiments using resonance ejection can be used to analyze higher m/z ions than can be achieved in mass selective instability experiments.

Many additional methods of manipulating ions in traps are know from the prior art including ion trapping, precursor isolation, CID, tandem mass spectrometry, ion-ion reactions, etc. Such methods may be applied, not only to the Paul trap as described above, but also to the other prior art trapping devices described below and to the present invention.

The cylindrical ion trap (CIT) is a simplified form of the Paul trap described above. The cylindrical ion trap is formed by a central cylinder instead of a hyperbolic ring electrode, and two flat plates instead of hyperbolic end caps. Due the simplified geometry of these electrodes, the CIT has a lower resolution than conventional Paul traps of similar inner diameter. However, because of its simplified construction—i.e. flat end caps and cylindrical ring electrode instead of hyperbolic surfaces—the CIT can more readily be miniaturized.

Yet another type of ion trap is the "linear ion trap". In principle, any type of multipole in which ions are trapped may be considered a linear ion trap, however, the device now commonly referred to as a linear ion trap can be used not only to trap ions but also to analyze them. As described by Schwartz et al. (J. C. Schwartz, M. W. Senko, and J. E. P. Syka, *J. Am. Soc. Mass Spectrom.* 13, 659 (2002)) a linear ion trap includes two pairs of electrodes or rods, which contain ions by utilizing an RF quadrupole trapping field in two dimensions, while a non-quadrupole DC trapping field is used in the third dimension. Simple plate lenses at the ends of a quadrupole structure can provide the DC trapping field. This approach, however, allows ions which enter the region close to the plate lenses to be exposed to substantial fringe fields due to the ending of the RF quadrupole field. These non-linear fringe fields can cause radial or axial excitation which can result in loss of ions. In addition, the fringe fields can cause shifting of the ions frequency of motion in both the radial and axial dimensions.

An improved electrode structure of a linear quadrupole ion trap 11, which is known from the prior art, is shown in FIG. 1. The quadrupole structure includes two pairs of opposing electrodes or rods, the rods having a hyperbolic profile to substantially match the equipotential contours of the quadrupole RF fields desired within the structure. Each of the rods is cut into a main or central section and front and back sections. The two end sections differ in DC potential from the central section to form a "potential well" in the center to constrain ions axially. An aperture or slot 12 allows trapped ions to be selectively resonantly ejected in a direction orthogonal to the axis in response to AC dipolar or quadrupolar electric fields applied to the rod pair containing the slotted electrode. In this figure, as per convention, the rod pairs are aligned with the x and y axes and are therefore denoted as the X and Y rod pairs.

In prior art according to Song et al. (Y. Song, G. Wu, Q. Song, R. G. Cooks and Z. Ouyang, J Am. Soc Mass Spectrom. 17, 631 (2006) and U.S. Pat. No. 6,838,666 which is incorporated herein by reference), the hyperbolic rods of the conventional 2D linear ion trap were replaced by rectangular electrodes. This design (shown in FIG. 2) is now known as a rectilinear ion trap (RIT). According to Song et al. the trapping volume is defined by x and y pairs of spaced flat or plate RF electrodes 15, 16 and 13, 14 in the zx and zy planes. Ions are trapped in the z direction by DC voltages applied to spaced flat or plate end electrodes (not shown) in the xy plane disposed at the ends of the volume defined by the x, y pair of plates, or by DC voltages applied together with RF in sections 18 and 19 each comprising pairs of flat or plate electrodes 15*a*, 16*a* and 13*a*, 13*b*. In addition to the RF sections flat or plate end electrodes can be added. The ions are trapped in the x, y direction by the quadrupolar RF fields generated by the RF voltages applied to the plates. Ions can be ejected along the z axis through apertures formed in the end electrodes or along the x or y axis through apertures formed in the x or y electrodes. The ion trap is generally operated with the assistance of a buffer gas. Thus, when ions are injected into the ion trap they lose kinetic energy by collision with the buffer gas and are trapped by the DC potential well. While the ions are trapped by the application of RF trapping voltages AC and other waveforms can be applied to the electrodes to facilitate isolation or excitation of ions in a mass selective fashion. To perform an axial ejection scan the RF amplitude is scanned while an AC voltage is applied to the end plates. Axial ejection depends on the same principles that control axial ejection from a linear trap with round rod electrodes (U.S. Pat. No. 6,177,668). In order to perform an orthogonal ion ejection scan, the RF amplitude is scanned and the AC voltage is applied on the set of electrodes which include an aperture. The AC amplitude can be scanned to facilitate ejection. Circuits for applying and controlling the RF, AC and DC voltages are well known.

The addition of the two end RF sections 18 and 19 to the RIT also helps to generate a uniform RF field for the center section. The DC voltages applied on the three sections establish the DC trapping potential and the ions are trapped in the center section, where various processes are performed on the ions in the center section.

The most significant advantage of the RIT over the LIT is that of fabrication. The electrodes composing the RIT, being flat surfaces, are much easier to produce, with precision, than the hyperbolic surfaces of the LIT. As a result, the RIT can be more readily miniaturized than the LIT and can be more readily incorporated into portable instruments.

In order to determine the structure of an original analyte molecule it is often helpful to dissociate molecular ions into fragments. Typically, the fragment ions are then mass analyzed. The masses and mass differences between the fragment ions can be used then to determine the original molecule's structure. There are many means of fragmenting precursor analyte ions—collision induced dissociation (CID), infrared multi photon dissociation (IRMPD), surface induced dissociation (SID), etc. The production of identifiable fragment ions is an important measure of the success of a dissociation method.

Collision induced dissociation (CID) is a widely used prior art method used in tandem mass spectrometry experiments. During CID, the internal energy of precursor ions is increased via collisions between the precursor ion and collision gas. The increased internal energy of the ion causes it to dissociate into one or more fragment ions. Collisional activation of precursor ions is achieved by accelerating the ion via an electric field. In instruments using quadrupole filters, the accelerating electric field is typically applied between adjacent multipoles. That is, analyte ions enter the quadrupole filter. In the filter, ions of the mass of interest—i.e. precursor ions—are selected. The selected precursor ions exit the quadrupole filter and are accelerated by an electric field into a collision cell. The collision cell includes another RF multipole used to confine the ions as they undergo activation and fragmentation. The resulting precursor and fragment ions pass through and out of the collision cell multipole and to downstream optics and/or detectors.

In a multipole trap, activation toward dissociation may be accomplished by resonant excitation of the precursor. In a resonant excitation experiment, the electric field used to accelerate the ions is an RF potential applied between the trapping electrodes at the secular frequency of the precursor. In a conventional Paul trap the excitation electric field, for example, might take the form of a 150 mVp-p sine wave applied between the endcap electrodes for a period of tens of milliseconds. Alternatively, a higher amplitude electric field (~1 Vpp) might be applied for a shorter time (~2 ms). Further, as described in the prior art of Glish et al. (C. Cunningham Jr., G. L. Glish, and D. J. Burinsky, *J Am Soc Mass Spectrom* 17, 81 (2006)) and Schwartz et al. in U.S. Pat. No. 7,102,129, the amplitude of the RF potential confining the ions in the trap may be reduced after collisional activation so that fragment ions of low m/z can be observed.

Another fragmentation method used in tandem mass spectrometry experiments is electron capture dissociation (ECD). The prior art method of ECD (K. Vekey, A. G. Brenton, et al., *Int J Mass Spectrom Ion Process* 70, 277 (1986); F. W. McLafferty, *Mass Spectrometry in the Analysis of Large Molecules*, C. J. McNeal, Ed., John Wiley, New York, 1986, pp 107-120; and N. C. Polfer et al., *Rapid Commun Mass Spectrom* 16, 936 (2002)) activates multiply charged positive precursor ions toward fragmentation by partial neutralization of the ion using low kinetic energy electrons. The energy associated with neutralization is often sufficient to produce prompt fragmentation.

Electron transfer dissociation (ETD) and electron capture dissociation (ECD) tandem mass spectrometry techniques have been shown to be useful for the characterization of peptides and proteins (e.g. top-down analysis). Both techniques produce c- and z-type fragment ions, which are complementary to the b- and y-type fragment ions produced in collision induced dissociation (CID). Additionally ETD and ECD provide more extensive fragmentation than CID, resulting in richer product ion spectra and better sequence coverage. Moreover, ETD and ECD are processes which tend to preserve weakly bound post-translational modifications (PTMs) thereby enabling a means of identification and localization of PTMs by mass spectrometry. Neutral loss scans (in a triple quadrupole or ion trap) in conjunction with CID can be used to look for the loss of PTMs, however, this scanning method is an indirect measurement and not always efficient at identifying all PTMs. The reason why ETD and ECD preserve PTMs is highly debated, and whether the processes are ergodic or non-ergodic does not change the utility of the techniques. The combination of the complementary information to CID, richer sequence coverage, and the identification of PTMs make ETD and ECD powerful analytical proteomics tools.

Prior art instruments primarily combine ETD with conventional Paul ion traps (3-D ion traps), linear ion traps (2-D ion traps), and hybrid quadrupole time of flight mass analyzers (qTOF). For trap analyzers, which have a fixed line width across the mass range, it is necessary to perform charge manipulation techniques to reduce the charge of the ions if complex ion populations are to be resolved. Reducing the number of charges on an ion results in a larger spacing between the isotopes and also shifts the ion m/z to a region of the mass spectrum that allows the isotopes to be resolved and the actual charge state and molecular mass determined.

In performing ETD experiments in a 2-D or 3-D ion trap, the spatial overlap between reagent and analyte ions is inherent to the operation of the device. Because the pressure is relatively high, both positive and negative ions are collisionally cooled to the center of the storage device. As a result the reagent and analyte ions occupy nearly the same volume. This strong spatial overlap, of course, tends to promote the ETD reaction. This spatial overlap between the reagent and analyte ions can be optimized but does not change from experiment to experiment. The efficiency of ETD in the 3-D traps suggests that it may be possible to generate ETD data without the need to average multiple mass spectra. In addition the time necessary for the accumulation and reaction for an ETD experiment are typically amenable to on-line separations.

Xia et al. demonstrated an experimental setup in which ions were trapped in a linear quadrupole ion trap using only RF potentials (Xia, Y.; Chrisman, P. A.; Erickson, D. E.; Liu, J.; Liang, X. R.; Londry, F. A.; Yang, M. J.; McLuckey, S. A. *Anal. Chem.* 2006, 78, 4146-54). Once trapped, the analyte ions were reacted with ETD reagent ions. Product ions and remaining analyte ions were transferred from the quadrupole trap to an orthogonal time-of-flight (OTOF) mass analyzer for mass analysis.

Postactivation—i.e. ion activation following the ETD reaction—is an important issue in ETD experiments. Swaney et al. (D. L. Swaney, G. C. McAlister, M. Wirtala, J. C. Scwartz, J. E. P. Syka, and J. Coon, *Anal. Chem.* 79, 477 (2007).) have shown that postactivation can substantially improve the fragmentation efficiency of ETD experiments. In ETD experiments an electron is transferred from the reagent ion to the analyte ion. In many cases, the energy from the resulting charge neutralization can fragment the analyte ion. However, in some cases a charge reduced nondissociated precursor ion is produced. In such cases additional energy is required to form fragment ions. The additional energy can be provided by accelerating the ions to a few eV of kinetic energy and then allowing the ions to collide with gas molecules in the trapping device. In a quadrupole trap this can be done by introducing a supplemental excitation waveform.

In the course of performing ion-ion reaction experiments such as ETD, it is often useful to trap a first reactant ion type in a first ion trap and a second reactant ion type in a second ion trap. The ions can then be allowed to mix and react for a well controlled, predetermined time.

When performing tandem mass spectrometry experiments in prior art traps, typically all analyte ions except for a single type of selected precursor ion are ejected from the trap. As a result, all ions except for the selected precursor are lost. Fragment ions may be formed from the selected precursor ion and these fragment ions may be further mass analyzed or fragmented, however, all other ions of potential interest originally stored in the trap are lost in the initial precursor isolation and are therefore unavailable for further analysis.

This is equally true of fragment ions when performing multiple step tandem mass spectrometry experiments. That is, if a precursor is selected, and if fragment ions are formed from the precursor, and then a single type of fragment ion is isolated for further fragmentation, then all the original ions except for the precursors will be lost and all the first generation fragment ions except for those isolated for further analysis will be lost.

As discussed below, the stacked well ion trap according to the present invention overcomes many of the limitations of prior art ion traps discussed above. The traps disclosed herein provides a unique combination of attributes making it especially suitable for use in the mass analysis of complex samples containing more than one type of analyte ion.

SUMMARY

In accordance with one embodiment of the invention, an apparatus and method are provided for containing and manipulating ions in a multitude of pseudopotential wells. According to this embodiment, the apparatus has no electrodes separating the pseudopotential wells. Rather, there are no barriers between the pseudopotential wells except the electrodynamic potentials represented by the pseudopotential wells themselves. Unlike prior art devices, ions can be transmitted from one pseudopotential well to another without losses due to collisions of the ions with electrodes or other ion optical elements. In further alternate embodiments, interstitial electrodes may cover part of the gap between adjacent pseudopotential wells.

According to another embodiment, an apparatus and method are provided for containing and manipulating ions in a multitude of quadrupolar pseudopotential wells. According to this embodiment, the apparatus has no electrodes separating the pseudopotential wells. Rather, there are no barriers between the pseudopotential wells except the electrodynamic potentials represented by the pseudopotential wells themselves. Unlike prior art devices, ions can be transmitted from one pseudopotential well to another without losses due to collisions of the ions with electrodes or other ion optical elements. Prior art quadrupole methods of mass selective stability, mass selective instability, and resonance ejection can be performed within or between pseudopotential wells. In one embodiment, resonance ejection is used to eject ions of a selected type from a first pseudopotential well into a second pseudopotential well while maintaining ions of substantially all other types in the first pseudopotential well. Any other know prior art quadrupole method including ion isolation methods, excitation methods, dissociation methods, and ion-ion, ion-neutral, or ion-electron reaction methods, may be used in conjunction with the present invention. In further alternate embodiments, interstitial electrodes may cover part of the gap between adjacent pseudopotential wells.

According to another embodiment, an apparatus and method are provided for containing and manipulating ions in a multitude of quadrupolar pseudopotential wells using substantially planar electrodes to form substantially rectilinear fields. According to this embodiment, the apparatus has no electrodes separating the pseudopotential wells. Rather, there are no barriers between the pseudopotential wells except the electrodynamic potentials represented by the pseudopotential wells themselves. Unlike prior art devices, ions can be transmitted from one pseudopotential well to another without losses due to collisions of the ions with electrodes or other ion optical elements. Prior art quadrupole methods of mass selective stability, mass selective instability, and resonance ejection can be performed within or between pseudopotential wells. In one embodiment, resonance ejection is used to eject ions of a selected type from a first pseudopotential well into a second pseudopotential well while maintaining ions of substantially all other types in the first pseudopotential well. Any other know prior art quadrupole method including ion isolation methods, excitation methods, dissociation methods, and ion-ion, ion-neutral, or ion-electron reaction methods, may be used in conjunction with the present invention. In further alternate embodiments, interstitial electrodes may cover part of the gap between adjacent pseudopotential wells.

According to another embodiment, an apparatus and method are provided for containing and manipulating ions in a multitude of quadrupolar pseudopotential wells formed using cylindrically symmetric electrodes. According to this embodiment, the apparatus has no electrodes separating the pseudopotential wells. Rather, there are no barriers between the pseudopotential wells except the electrodynamic potentials represented by the pseudopotential wells themselves. Unlike prior art devices, ions can be transmitted from one pseudopotential well to another without losses due to collisions of the ions with electrodes or other ion optical elements. Prior art quadrupole methods of mass selective stability, mass selective instability, and resonance ejection can be performed within or between pseudopotential wells. In one embodiment, resonance ejection is used to eject ions of a selected type from a first pseudopotential well into a second pseudopotential well while maintaining ions of substantially all other types in the first pseudopotential well. Any other know prior art quadrupole method including ion isolation methods, excitation methods, dissociation methods, and ion-ion, ion-neutral, or ion-electron reaction methods, may be used in conjunction with the present invention. In further alternate embodiments, interstitial electrodes may cover part of the gap between adjacent pseudopotential wells.

In accordance with the present invention, ions of a selected type may be resonantly ejected from a first pseudopotential well into a second pseudopotential well while maintaining ions of substantially all other types in the first pseudopotential well. The selected ions may be caused to dissociate, for example by CAD, ETD, IRMPD, or any other known method of dissociation. The fragment ions may then be analyzed by a resonance ejection scan out of the second pseudopotential well into a detector.

Alternatively, the fragment ions may be mass inselectively transmitted to another analyzer for mass analysis or further manipulations. Once ions associated with the first selected type have cleared the second pseudopotential well, a second type of ions may be resonantly ejected from the first pseudopotential well into the second pseudopotential well, dissociated, and analyzed. This process may be repeated any number of times until all ions of interest from the first pseudopotential well have been fully analyzed.

BRIEF DESCRIPTION OF THE DRAWINGS

For a more complete understanding of the present invention, reference is now made to the following drawings in which.

DETAILED DESCRIPTION

While the invention has been shown and described with reference to a number of embodiments thereof, it will be recognized by those skilled in the art that various changes in form and detail may be made herein without departing from the spirit and scope of the invention as defined by the appended claims.

As discussed above, the present invention relates generally to the mass spectroscopic analysis of chemical samples and more particularly to mass spectrometry. Specifically, a method is described for the mass spectrometric analysis of a sample. Reference is herein made to the figures, wherein the numerals representing particular parts are consistently used throughout the figures and accompanying discussion.

Figure 1:
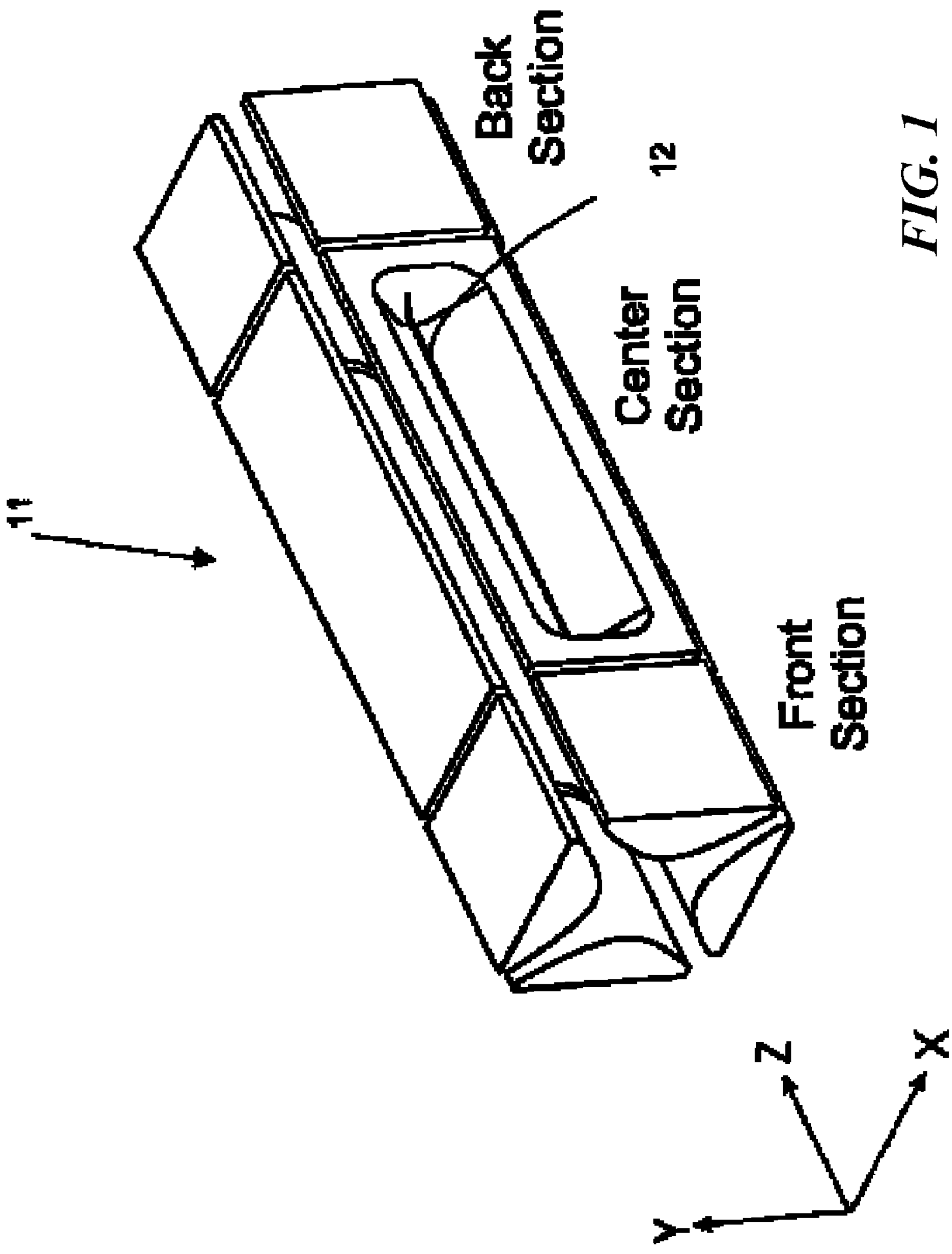
FIG. 1 Prior Art
FIG. 1 depicts a prior art linear ion trap according to Schwartz et al.
Figure 2:
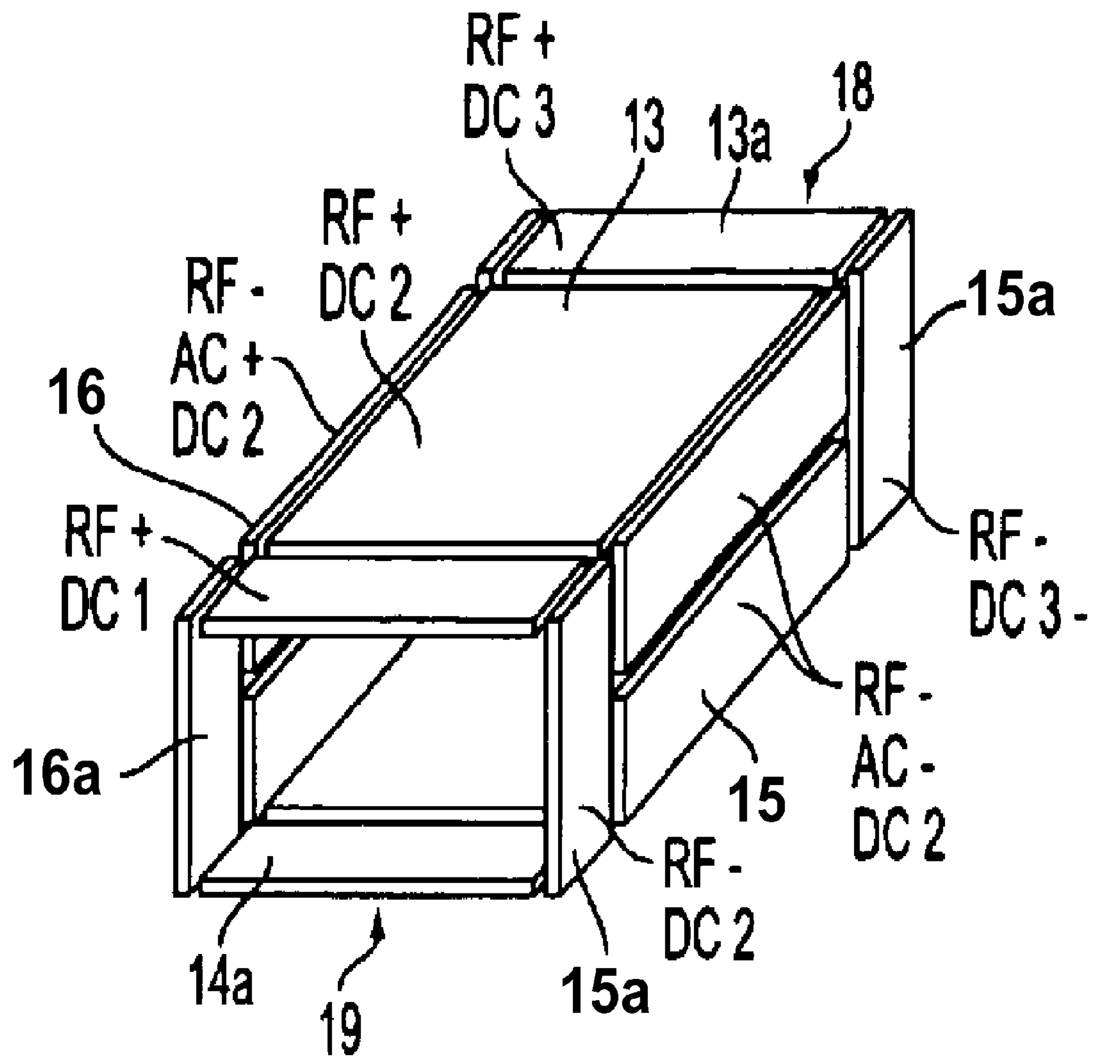
FIG. 2 Prior Art
FIG. 2 depicts a prior art rectilinear ion trap according to Ouyang et al.
Figure 3:
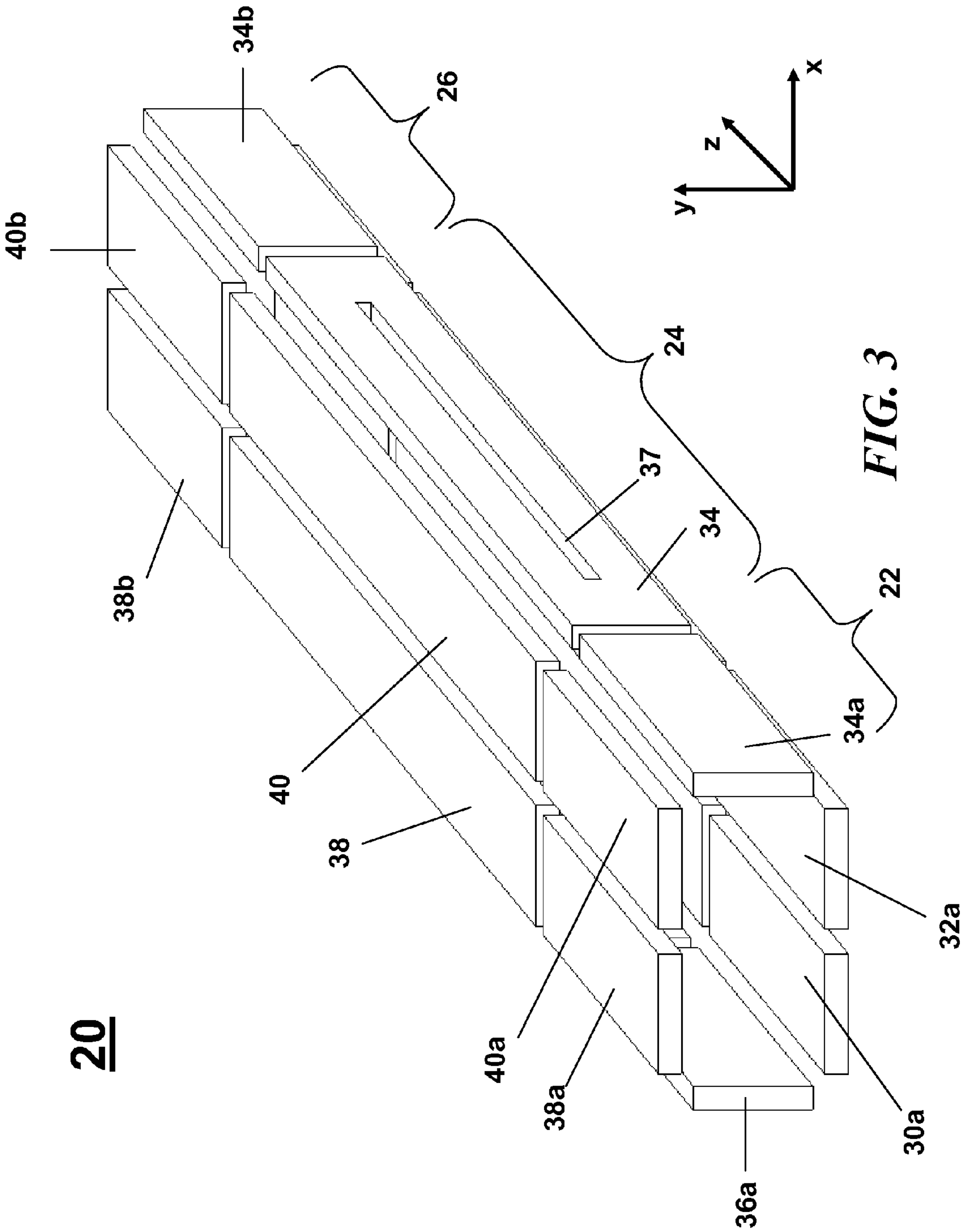
FIG. 3 depicts a rectilinear ion trap according to the present invention having two pseudopotential wells.

FIG. 3 depicts dual rectilinear ion trap (DRIT) 20 according to a preferred embodiment of the present invention. Ion trap 20 consists of center section 24, front section 22, and back section 26. Each section, 22, 24, and 26 consist of six electrodes arranged symmetrically about two axes, 48 and 50. Front section 22 consists of electrodes 30*a*, 32*a*, 34*a*, 36*a*, 38*a*, and 40*a*. Center section 24 consists of electrodes 30, 32, 34, 36, 38, and 40 and back section 26 consists of electrodes 30*b*, 32*b*, 34*b*, 36*b*, 38*b*, and 40*b*. All the above referenced electrodes forming trap 20 are planar. The dimensions and placement of the above referenced electrodes may be any desired dimensions and placement, however, as an example, all the electrodes forming trap 20 are 10 mm wide and 2 mm thick. As shown in FIG. 3, electrodes having the same numerical designation—e.g. 30*a*, 30, and 30*b*—are adjacently aligned and in the same plane. Electrodes 30*a* and 30 and electrodes 30 and 30*b* are separated from each other by 1 mm along the z-axis. Other electrodes are separated similarly from one another along the z-axis. Electrodes 38 and 40 are separated from one another along the x-axis by 2 mm. Similarly, electrodes 30 and 32 are separated from one another along the x-axis by 2 mm. Electrodes 32 and 40 and electrodes 30 and 38 are separated from one another by 12 mm along the y-axis. Electrodes 34 and 36 are separated from each other along the x-axis by 24 mm. The length of the electrodes composing front section 22 and back section 26 is 15 mm. The length of the electrodes composing center section 24 is 40 mm.

In alternate embodiments, trap 20 may be "stretched" in one or more dimensions. In the embodiment described above with reference to FIG. 3, the interior dimension of trap 20 along the x-axis (24 mm) is twice that along the y-axis (12 mm). In alternate embodiments, the width of electrodes 38, 40, 30 and 32 along the x-axis may be increased to 13 mm. This increases the inner dimension of trap 20 to 30 mm along the x-axis. As described in the prior art (Z. Ouyang, et al., *Anal. Chem.* 76, 4595 (2004).) stretching a RIT can improve its performance. In a similar manner stretching a DRIT in accordance with the present invention can also improve its performance.

In order to establish pseudopotential wells about axes 48 and 50 (shown in FIG. 4) and thereby laterally (i.e. in the x-y plane) that confine ions in trap 20, an RF potential is applied between the electrodes of trap 20. In the preferred method of operation, the RF potential has two phases separated by 180°. Both phases have the same amplitude and frequency. The function, amplitude, and frequency of the RF potential may be any desired function, amplitude, and frequency, however, as an example, the RF potential may be sinusoidal having an amplitude of 1 $kV_{pp}$, and a frequency of 1 MHz. Electrodes having the same numerical designation—e.g. 30*a*, 30, and 30*b*—will have the same phase and amplitude RF applied to them. Electrodes 30*a*, 30, 30*b*, 38*a*, 38, and 38*b* have a first phase of the RF potential applied to them whereas electrodes 32*a*, 32, 32*b*, 40*a*, 40, and 40*b* have a second phase—i.e. 180° away from the first phase—of the RF potential applied to them. Electrodes 34*a*, 34, 34*b*, 36*a*, 36, and 36*b* are held at ground potential.

Figure 4:
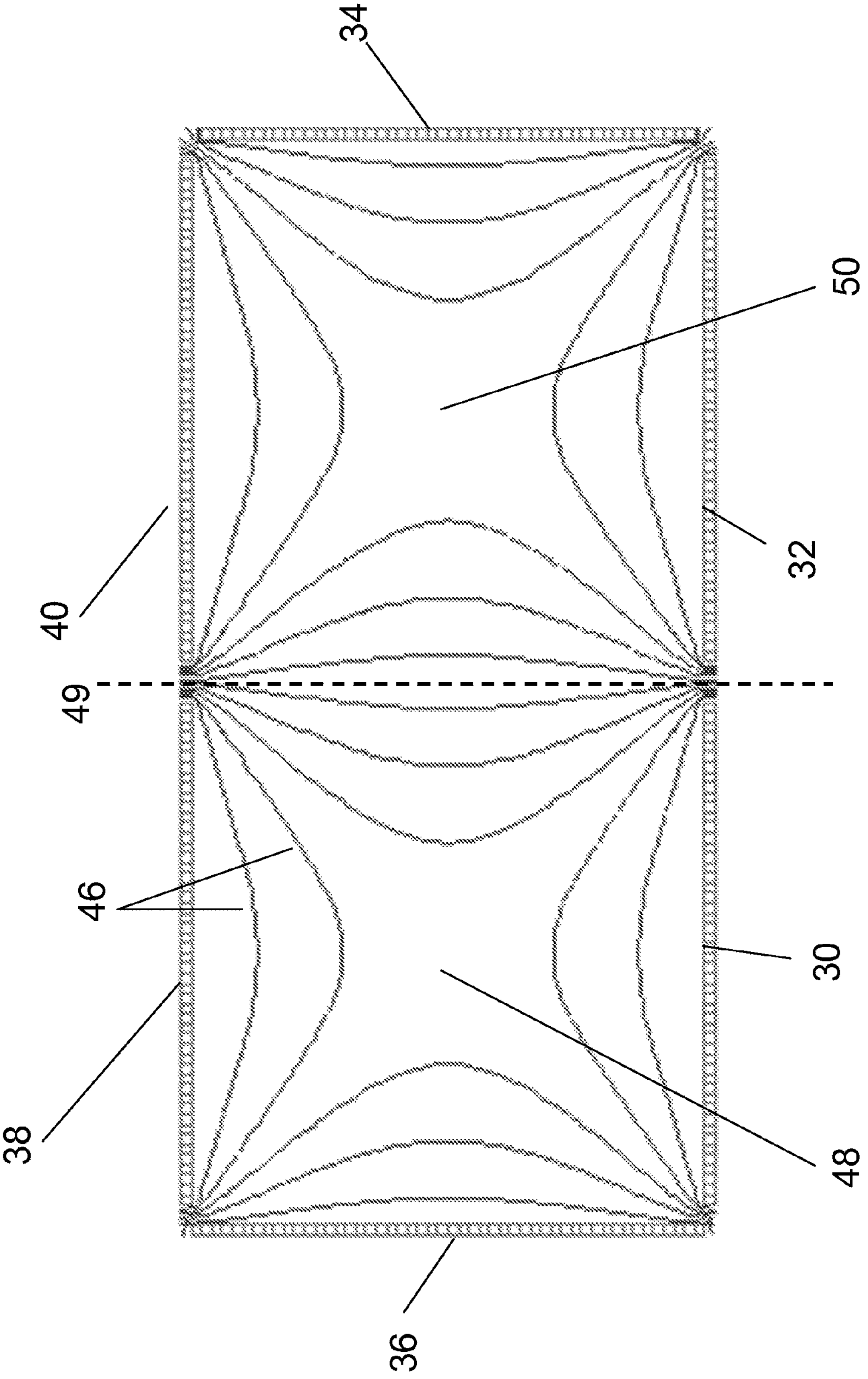
FIG. 4 is a plot of the equipotential lines in the rectilinear ion trap of FIG. 3 when potentials are applied to the electrodes according to the preferred method.

Applying RF potentials as described above produces an electric field in trap 20 as depicted in FIG. 4. FIG. 4 is the result of a calculation of the potential as a function of position inside trap 20 at an instant in time when the RF potential on electrodes 30 and 38 is +100V and the potential on electrodes 32 and 40 is −100V. The potential on electrodes 34 and 36 is 0V. Equipotential lines 46 show clearly that the electric field is quadrupolar near both axes 48 and 50. That is, if the origin of a Cartesian coordinate system is taken to be on one of axes 48 or 50, then the potential near that axis will take the form $A(x^2-y^2)+B$, where A and B are constants. Notice that the potential at center plane 49 is 0V even though there is no electrode at this position. Each of the quadrupolar field regions are thus bound on two sides by a ground plane and on two sides by RF electrodes.

The RF potential applied to trap 20 establishes a pseudopotential well about axes 48 and 50 such that ions in trap 20 are laterally confined about axes 48 and 50. To confine ions along axes 48 and 50, a DC potential may be applied between sections 22, 26 and 24. Any desired DC potential difference may be applied between sections 22, 24 and 26, however, as an example, section 24 may be held at a DC (i.e. time averaged) potential of 0V whereas the potential on sections 22 and 26 may be held at a DC potential of 5V. In such a case positively charged ions will be repelled from sections 22 and 26 and attracted to section 24. Thus, positively charged ions would be trapped laterally by the RF potential and axially by the DC potential.

Trap 20 is operated at a pressure such that ions in trap 20 may be cooled via collisions with gas. Any pressure of any type of gas may be used in conjunction with trap 20, however, as an example, trap 20 may be maintained at a pressure of greater than about 5E-4 mbar and less than about 1E-2 mbar of nitrogen.

Ions may be formed in trap 20 by, for example, laser ionization of analyte gas introduced into trap 20. Alternatively, analyte ions may be injected into trap 20 from an external ion source. Electrodes 34 and 36 include slots 37 and 39 (see cross sectional view of FIG. 5B) respectively through which ions may enter and exit trap 20. Slots 37 and 39 may be of any desired dimensions, however, as an example, slots 37 and 39 are each 30 mm long and 1 mm high. Ions from an external ion source are accelerated to a kinetic energy sufficient to overcome the pseudopotential barrier formed by the above mentioned RF potential. The ions then pass through slot 37 and into the pseudopotential well around axis 50. In order to be trapped in the pseudopotential well, the kinetic energy of the ions must then be reduced via collisions with the gas in trap 20. The gas in trap 20 is therefore ideally maintained at a pressure high enough that the ions have a high probability of undergoing at least one collision in the time necessary for the ion to pass laterally through the pseudopotential well. As discussed above, this is typically a pressure of 5E-4 mbar or higher.

Ions may alternatively enter trap 20 via slit 39 in electrode 36. In such a case the ions would first encounter the pseudopotential well about axis 48. Ions entering trap 20 through slit 39 will undergo collisions with the gas in trap 20. With each collision, the ions will lose kinetic energy. If the ions have enough collisions in their first passage between slit 39 and center plane 49, they will have insufficient energy to overcome the pseudopotential barrier between axis 48 and 50 and will be trapped in the well about axis 48. Alternatively, if the kinetic energy of ions entering through slit 39 is high or if the pressure of gas in the trap 20 is relatively low, then the ions may not lose enough energy in their first pass between slit 39 and plane 49 and may therefore pass into the well centered on axis 50. In such a case analyte ions may be distributed between and trapped in both the pseudopotential well centered on axis 48 and that centered on axis 50.

In alternate methods of operation, ions may enter and exit trap 20 along axes 48 and 50 via sections 22 and 26. As discussed above a DC potential may be applied between sections 22, 26, and 24 in order to trap ions axially within trap 20. The RF potentials applied as discussed above will also create a pseudopotential barrier along axes 48 and 50 that will tend to prevent ions from entering and exiting trap 20 along axes 48 and 50. To be injected into trap 20 along axes 48 and 50, ions must have sufficient kinetic energy and preferably should be injected at the optimum phase in the RF. The injection of ions over the pseudopotentially barrier along axes 48 or 50 or through slots 37 or 39 is similar to the injection of ions into prior art Paul traps. Methods of ion injection known in the prior art with respect to Paul may be used in conjunction with the present invention. Ions may be directed from outside trap 20 with a high velocity along axis 48 into section 22. The source of ions may have a DC potential higher than that on trap section 22 such that ions are accelerated into section 22. Once over the RF pseudopotential barrier, the ions may lose energy via collisions with gas and thereby be trapped in section 24.

In alternate embodiments entrance and exit gate electrodes may be placed on either end of trap 20. Such gate electrodes may, for example, be apertured planar conducting electrodes placed with the apertures on axes 48 and 50 and with the plane occupied by the electrode perpendicular to axes 48 and 50. Alternate embodiments may include four gate electrodes, a first gate electrode at one end of trap 20 having an aperture aligned with axis 48, a second gate electrode at the opposite end of trap 20 having an aperture aligned with axis 48, a third gate electrode at one end of trap 20 having an aperture aligned with axis 50, and a fourth gate electrode at the opposite end of trap 20 having an aperture aligned with axis 50. In alternate embodiments, ions may enter trap 20 via the apertures in the gate electrodes. In alternate embodiments, RF and DC potentials may be applied to the gate electrodes so as to prevent and, at other times, allow the ions to pass into or out of trap 20 via the apertures in the gate electrodes.

Once ions are trapped in a pseudopotential well they may be manipulated in various previously unavailable, sophisticated ways. Importantly, ions can be transferred without losses, in a selective or an unselective manner, back and forth between the pseudopotential wells. Notice in FIG. 3 that there is no physical obstruction between the pseudopotential wells centered on axes 48 and 50. That is, there is nothing between the wells for the ions to collide with.

Any type of experiment known in the prior art that can be performed in an ion trap can be performed in conjunction with the present invention. Such experiments include but are not limited to mass analysis by a resonance ejection scan or a mass selective instability scan, resonance excitation, isolation, CID, IRMPD, ETD, and any other fragmentation experiments, ion-molecule reactions, ion-ion reactions, and tandem MS experiments.

As with prior art traps, a mass selective instability scan is performed by ramping the RF amplitude applied to electrodes 30, 32, 38, and 40 and detecting ions that exit one or both of slots 37 and 39 as a function of RF amplitude. As with prior art traps, the RF is ramped from low to high amplitude and the ions detected are initially of low m/z and are higher m/z as the RF amplitude is increased. The same principles of physics, equations of motion, calibration function, etc. used with prior art traps may be applied to the present invention.

A resonance ejection scan in conjunction with the present invention is also performed in much the same manner as with a prior art trap. As the RF amplitude is increased an AC potential is applied between electrodes 34 and 36 in much the same manner as the AC potential is applied to the end caps of a prior art Paul trap. The AC potential is applied at a fixed frequency such that as the RF amplitude is increased, ions of successively higher m/z come into resonance with the AC potential. When the ions come into resonance with the AC potential they pick up energy from the AC potential and are ejected from trap 20 through slots 37 and/or 39.

For the purpose of isolation, mass selective stability experiments may be performed. By applying an appropriate RF and DC to the elements of trap 20, ion of all but a selected m/z or m/z range can be ejected from trap 20. A mass selective stability experiment may be performed, for example, by applying the appropriate RF and DC potentials between electrodes 30, 32, 38, and 40. As described above, a first phase of RF is applied to electrodes 30 and 38 whereas a second phase separated from the first by 180° is applied to electrodes 32 and 40. In a mass selective stability experiment, the DC is applied in a similar manner—i.e. a DC potential of a first polarity is applied to electrodes 30 and 38 and a DC potential of the opposite polarity but the same magnitude is applied to electrodes 32 and 40. The required RF amplitude and DC potentials can be predicted in the same manner and using the same equations as in prior art traps.

Notice that if all analyte ions start in a single pseudopotential well, then the selected analyte ions will remain in that well after the mass selective stability experiment. All other ions will be ejected from trap 20—i.e. they will reside in neither pseudopotential well. In alternative experiments, selected ions may be transferred from one pseudopotential well to another. In a resonance ejection experiment, for example, assuming all analyte ions start in one pseudopotential well, selected ions can be ejected from one well into the other well of trap 20 by applying the AC potential to only one of electrodes 34 or 36. In this experiment, a fixed RF amplitude is applied to trap 20. Assuming all ions start in the pseudopotential well centered on axis 48, an AC potential is applied to electrode 36. The frequency of the AC potential is chosen to be in resonance with the secular frequency of the ion of interest and of an amplitude sufficient to eject the ions of interest before collisional cooling can occur. The AC potential amplitude should also be chosen to be as low as possible so that the selectivity of the ejection is as high a possible. Ions of interest will be ejected from the pseudopotential well centered on axis 48. Some of these ions will be ejected towards the pseudopotential well around axis 50. Some of these ions will undergo collisions with gas, lose energy, and become trapped in the well centered on axis 50. The fraction of ions ejected towards the pseudopotential well around axis 50 can be increased by applying a repelling DC potential to electrode 36. Ions not excited by the AC potential will remain in the well centered on axis 48 and may be subjected to further manipulations and experiments.

The selected ions that are transferred by resonance excitation to the pseudopotential well around axis 50 may be further manipulated, fragmented, reacted, and otherwise analyzed. To perform a CID experiment on the selected analyte ions, for example, a low amplitude AC potential may be applied to electrode 34. The AC potential is applied at the resonant frequency of the ion of interest such that the ions gain kinetic energy from the AC potential. An RF amplitude corresponding to a q of greater than about 0.6 can be beneficial during the CID experiment, because it allows for the trapping of more highly excited precursor ions. Through collisions with gas while under the influence of the AC potential, the selected ions are activated towards dissociation. Some of the dissociation products are ionized and can be further analyzed. These fragment ions can be mass analyzed directly by, for example, a resonance ejection scan in trap 20. Alternatively, the fragment and remaining precursor ions can be mass inselectively transferred to another mass analyzer for mass analysis there. Alternatively, a selected fragment ion may be isolated by, for example, mass selective stability and then further fragmented as in the course of an $MS^3$ or $MS^n$ experiment.

Once the ions of interested have been fully analyzed and ejected from trap 20, one or more of the ion types remaining in the pseudopotential well about axis 48 may be selected by resonance ejection and thereby transferred to the well about axis 50. The above set of experiments may then be performed on this second set of ions of interest. This process may be repeated as many times as desired or until all of the original set of analyte ions trapped in the well about axis 48 have been consumed.

To perform a resonance ejection scan of the fragment and remaining precursor ions in the well about axis 50 without disturbing the ions remaining in the well about axis 48. The AC potential is applied to electrode 34 at a frequency corresponding to a relatively low q. As the RF amplitude is increased, ions will be ejected from the well around axis 50 but not from the well around axis 48 because the ions in the well around axis 48 do not experience the AC potential applied to electrode 34. The frequency of the AC potential is chosen such that the fragment ions of interest are ejected before the ions in the well about axis 48 become unstable due to the RF ramp.

To perform the mass unselective transfer mentioned above the DC potential difference between sections 26 and the downstream optics adjacent to trap 20 is increased so as to push the ions over the above mentioned axial pseudopotential barrier. In the case where gate electrodes are used, the potential on the gate electrode centered on axis 50 and adjacent to section 26 is made sufficiently attractive to pull the ions out through the axial pseudopotential.

As alternatives to CID other fragmentation may be used to form fragment ions from precursor ions of interest. Such methods include IR multiphoton dissociation (IRMPD), electron capture dissociation (ECD), electron transfer dissociation (ETD), or any other known method of fragmenting ions. To perform ETD, for example, one need only introduce ETD reagent ions into the well about axis 50 with the ions of interest. The axial and radial pseudopotential barriers will simultaneously hold both the positively charged analyte ions of interest and the negatively charged ETD reagent ions in the well about axis 50. As the analyte and reagent ions mix, they will react and form fragments from the analyte ions. ETD reagent ions can be introduced into trap 20 through slits 37 or 39 or along axes 48 or 50 in the same manner as described above with respect to the introduction of analyte ions.

In an alternative experiment, one might inject multiply charged positive analyte ions into the pseudopotential well about axis 48 and negatively charged reagent ions in the well about axis 50. Once the wells are filled with a selected number of ions, the reagent ions are transferred to the analyte well. The transfer may be achieved by resonance ejection from the well about axis 50 or a repulsive DC potential might be applied to electrodes 32, 34, and 40 sufficient to push the reagent ions out of the well about axis 50. Once mixed, the analyte and reagent ions will react to form product ions. Products of the ion-ion reaction can be analyzed directly in DRIT 20 or the products may be transferred mass unselectively to a downstream analyzer. The downstream mass analyzer may be of any known type including FTICR, TOF, or quadrupole mass analyzer. Alternatively, all analyte component ions are trapped in a first well and reagent ions in a second. Then, as described above, only selected analyte precursor ions are resonantly ejected from the first well into the second, while all remaining analyte ions are retained in the first well.

Figure 5A:
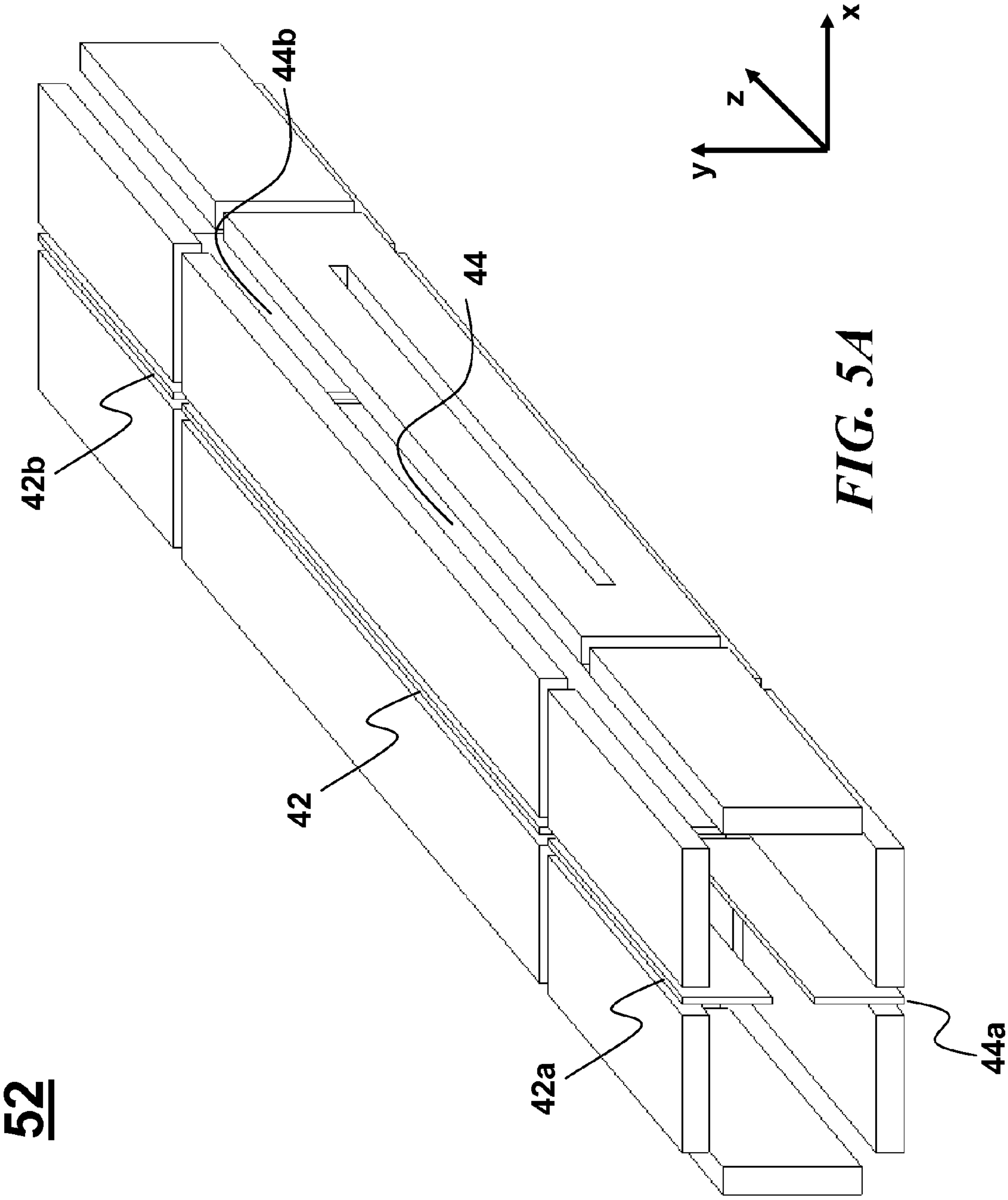
FIG. 5A depicts a rectilinear ion trap according to the present invention including interstitial electrodes between adjacent pseudopotential wells.
Figure 5B:
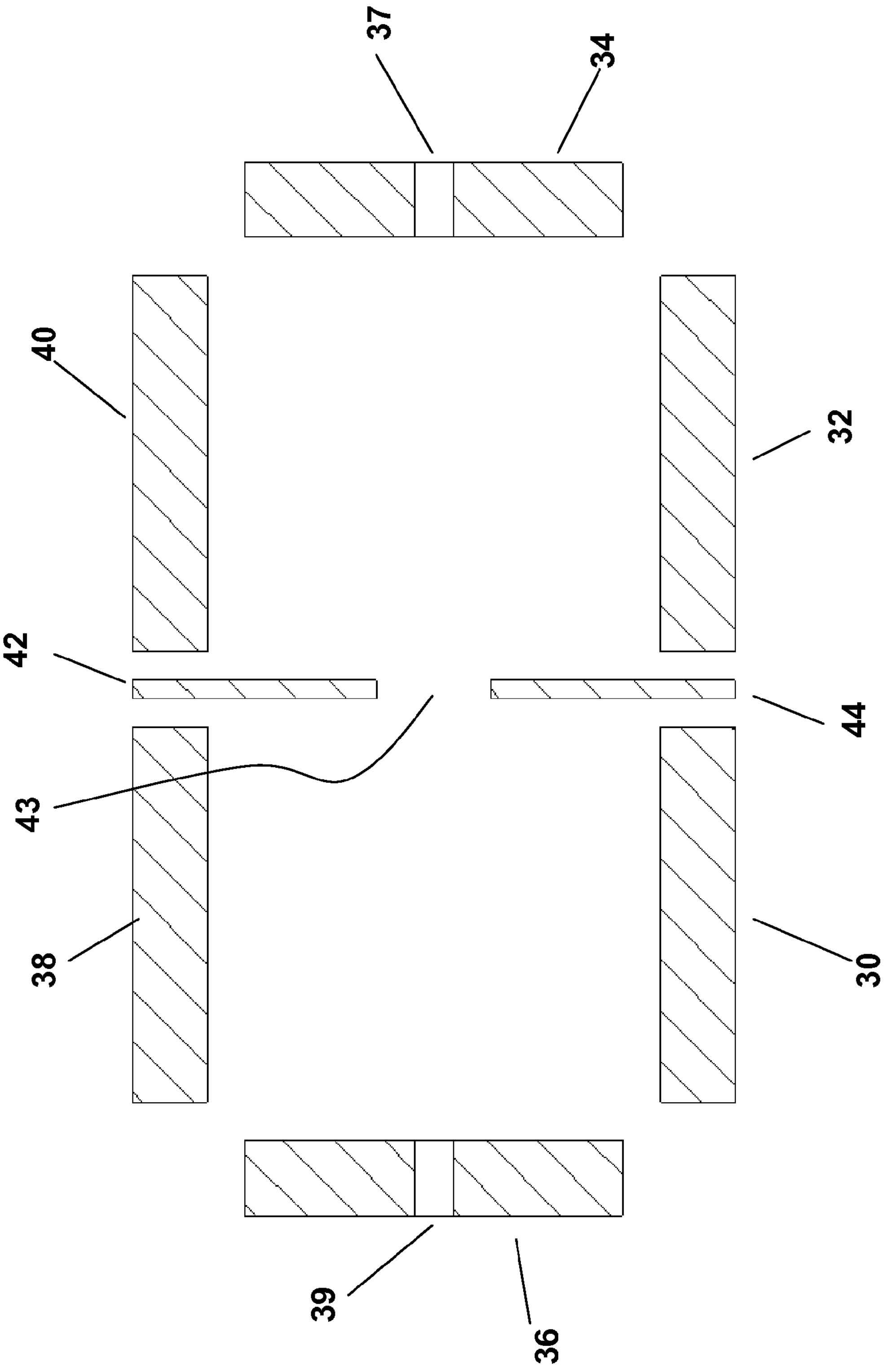
FIG. 5B is a cross sectional view of the rectilinear ion trap of FIG. 5A.

Turning next to FIG. 5A, an alternate embodiment of trap 52 according to the present invention is shown which has interstitial electrodes 42, 44, 42*a*, 44*a*, 42*b*, and 44*b* positioned on central plane 49 between RF electrodes 30, 32, 38, and 40. FIG. 5B shows a cross sectional view of trap 52 through center section 24. Interstitial electrodes 42 and 44 are positioned to leave gap 43 between them. Electrodes 42 and 44 are positioned such that ions may pass from the well about axis 48 to the well about axis 50 via gap 43. The dimensions and placement of electrodes may be any dimension and placement, however, as an example, the thickness of electrodes 42 and 44 is 0.5 mm and gap 43 between electrodes 42 and 44 is 3 mm. In alternate embodiments, thinner interstitial electrodes may be beneficial in that thinner electrodes would distort the electric field less. In further alternate embodiments, interstitial electrodes 42 and 44 may be replaced by an electrically conducting mesh which covers the entire central plane 49 within trap 52.

Any desired potential may be applied to interstitial electrodes 42 and 44, however, as an example, during ion trapping, interstitial electrodes 42 and 44 have no RF applied to them and are at the same DC potential as electrodes 34 and 36. The main benefit of interstitial electrodes 42 and 44 is to electrically isolate the regions around axis 48 and axis 50 during ion manipulations such as resonant ejection or excitation. When performing experiments in which ions in both pseudopotential wells are to be excited, an AC potential may be applied between interstitial electrodes 42 and 44 and electrode 34 and between interstitial electrodes 42 and 44 and electrode 36. However, when it is desired that only ions in the pseudopotential well about axis 48 be excited, then an AC potential may be applied only between interstitial electrodes 42 and 44 and electrode 36. Alternatively, to mass unselectively eject all ions from the well about axis 48 into that about axis 50, repulsive DC potentials may be applied to electrodes 30, 36, and 38. The DC electric field thus produced does not penetrate as far into the region about axis 50 as it would if interstitial electrodes 42 and 44 were not present. Thus, the presence of interstitial electrodes 42 and 44 reduces the influence of field about one axis on ions near the other axis.

In alternate methods of operation, RF is applied also to interstitial electrodes 42 and 44. In one such method, the above mentioned first phase of RF is applied to electrodes 38, 40, 30, and 32 and a second phase of RF separated from the first phase by 180° is applied to electrodes 36, 37, and interstitial electrodes 42 and 44. By applying the RF potentials in this manner, the axial pseudopotential barrier discussed above can be reduced or eliminated. The reduction or elimination of the axial pseudopotential barrier depends on the dimensions and placement of interstitial electrodes 42 and 44. If gap 43 is made to be smaller then the axial pseudopotential barrier will also tend to be smaller. Also, the asymmetric placement of the surfaces of interstitial electrodes 42 and 44 in trap 52 can be used to reduce the axial pseudopotential. In FIG. 5B notice that the plane occupied by the surface of electrodes 42 and 44 nearest axis 48 is 0.25 mm nearer axis 48 than the inner surface of electrode 36. Also notice that interstitial electrodes 42 and 44 extend vertically further than electrodes 36 and 34. Both the asymmetric placement and further vertical extension of electrodes 42 and 44 will tend to compensate for the presence of gap 43 in the present mode of operation. That is, the presence of slots 37, and 39 and gap 43 lead to asymmetries in the electric fields around axes 48 and 50 as well as an axial pseudopotential. The asymmetric placement and vertical extension of electrodes 42 and 44 can be used to partially bring the electric fields back into symmetry and to reduce the axial pseudopotential barrier.

In further alternate embodiments, electrodes 42*a* and 44*a* may be replaced by a single electrode extending vertically through trap 52 on center plane 49 in section 22. Similarly electrodes 42*b* and 44*b* may be replaced by a single electrode extending vertically through trap 52 on center plane 49 in section 26. Finally, electrodes 42 and 44 may be replaced by a single electrode extending vertically through trap 52 on center plane 49 in section 24. Such a contiguous interstitial electrode in center section 24 would include a slot of similar dimensions as slots 37 and 39 such that ions can pass through the slot so as to be moved from one pseudopotential well to another. Alternatively the contiguous interstitial electrode in center section 24 may be composed of an electrically conducting mesh such that ions can pass between the wires of the mesh when moving from one pseudopotential well to the other.

Figure 6:
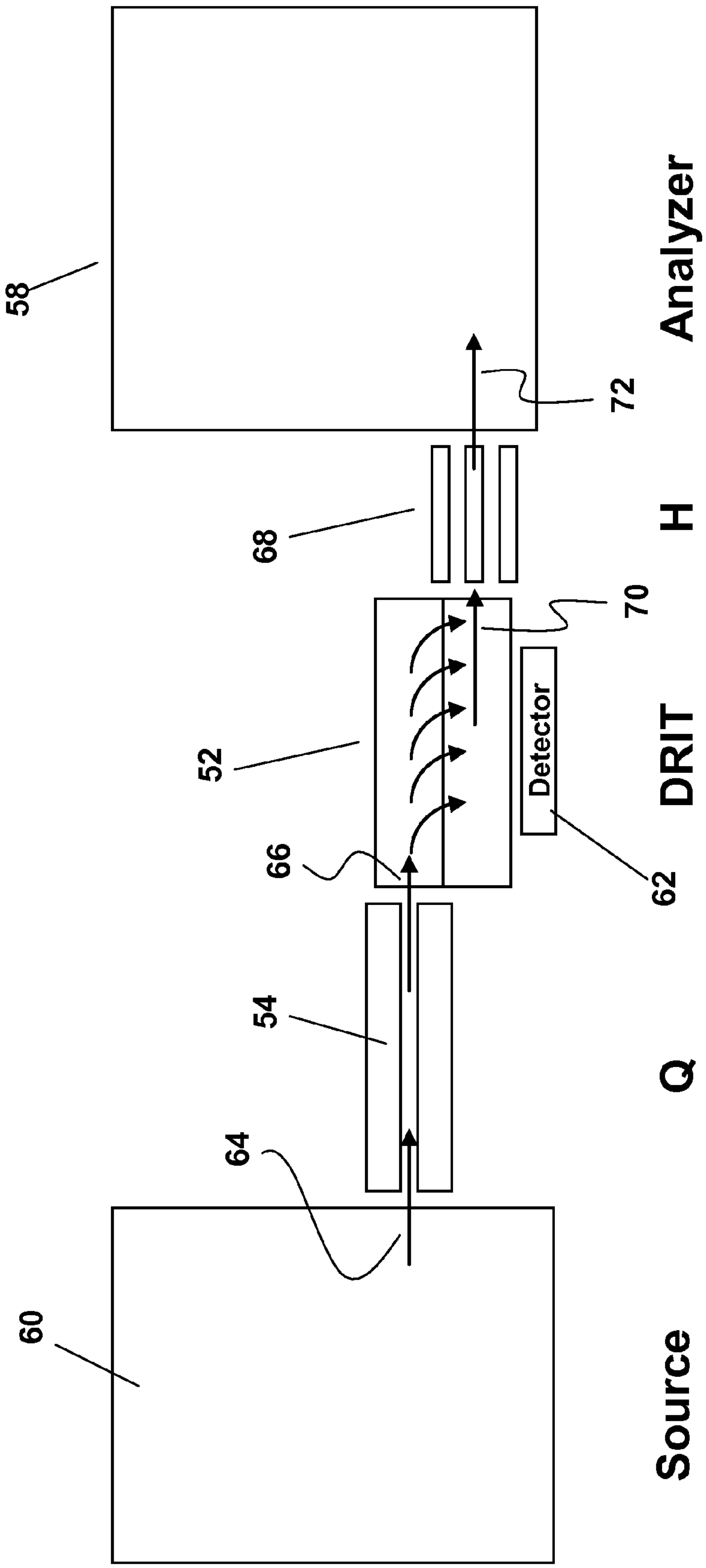
FIG. 6 depicts a rectilinear ion trap according to the present invention incorporated into a mass spectrometer.

Turning next to FIG. 6, a mass spectrometer incorporating DRIT 52 is depicted. The instrument depicted in FIG. 6 includes ion source 60, quadrupole 54, DRIT 52, ion detector 62, hexapole collision cell 68, and mass analyzer 58. Each of these components may occupy separate chambers in the instrument's vacuum system and may be operated at independent pressures. As an example, quadrupole 54 may be operated at a pressure of about 1E-5 mbar of nitrogen, DRIT 52 may be operated at a pressure of about 1E-3 mbar of helium, collision cell 68 may be operated at a pressure of about 1E-3 mbar of argon, analyzer 58 may be operated at a pressure of 1E-10 mbar of residual gas, and detector 62 may be operated at a pressure of 1E-5 mbar of residual gas.

Analyte ions are produced from sample material in ion source 60. Ion source 60 may be any ion source including, but not limited to, electrospray (ESI), matrix assisted laser desorption ionization (MALDI), atmospheric pressure chemical ionization (APCI), chemical ionization (CI), electron ionization (EI), fast atom bombardment (FAB), and any other known source of ions. The particulars of ion sources and their operation is well known in the prior art. A potential difference is maintained between ion source 60 and quadrupole filter 54 such that ions are accelerated from source 60 into quadrupole 54.

Under the influence of an electric field, analyte ions from ion source 60 follow path 64 into quadrupole filter 54. Because quadrupole 54 is maintained at a relatively low pressure, the ions undergo collisions with the gas only rarely. Thus, the ions retain a kinetic energy equal to the potential difference between source 60 and quadrupole 54 as they pass through quadrupole 54. Substantially all ions entering quadrupole 54 via path 64 may be allowed to exit quadrupole 54 along path 66 if the quadrupole 54 is operated in RF-only (i.e. transmission) mode. Alternatively, quadrupole 54 may be operated in isolation mode. In isolation mode, ions of a selected m/z or m/z range may pass through quadrupole 54 to the exclusion of ions of all other m/z values. The particulars of quadrupole filters, and their design and operation are well know in the prior art.

A potential difference is maintained between quadrupole 54 and DRIT 52 such that ions are further accelerated from quadrupole 54 into DRIT 52. Under the influence of the electric field, selected ions pass out of quadrupole 54 along path 66 into DRIT 52. Ions enter DRIT 52 via an aperture in a gate electrode centered on axis 48. As discussed above the ions become trapped through a combination of collisions with gas that cause the selected ions to lose kinetic energy, the pseudopotential that confines the ions radially about axis 48 and DC potentials between sections 22, 24 and 26.

Ions of interest are transferred from the pseudopotential well about axis 48 to the well about axis 50 via resonant ejection as described above. As further discussed above, the ions of interest may be caused to fragment by CID, IRMPD, ETD, or any other known fragmentation method while trapped in the well about axis 50. Alternatively, the ions may be caused to undergo ion-molecule or ion-ion reactions as described above and in the prior art. The product ions and remaining precursor ions of such manipulations can be analyzed by a resonance ejection scan into detector 60 or they can be mass unselectively ejected via path 70 into hexapole collision cell 68.

The mass unselective ejection of ions along path 70 may be accomplished by making the DC potential applied to section 26 more attractive to the ions while simultaneously making that on section 22 more repulsive. Also, the gate electrode centered on axis 50 adjacent to section 26 and collision hexapole 68 are successively more attractive still. As a result the product and remaining precursor ions are accelerated by the DC electric fields along axis 50 and path 70 into hexapole collision cell 68.

The potential difference between section 24 and collision cell 68 defines the kinetic energy the ions will have as they enter collision cell 68. If the potential difference is high enough, then the kinetic energy of the ions will be sufficient to cause CID. In alternative experiments, a product ion of interest—e.g. a fragment ion—may be selected, for example by mass selective stability, while still in section 24 of DRIT 52. The CID product ions formed in collision cell 68 would then be second generation fragment ions. The end result of such an experiment would be an $MS^3$ spectrum.

Collision cell 68 includes a hexapole composed of six rods to which an RF potential is applied. Ions are confined radially in the hexapole via the RF field. Ions are confined axially by the application of DC potentials applied to entrance and exit electrodes (not shown). The construction and operation of hexapoles and collision cells is well known in the prior art. In alternate embodiments the collision cell may be composed of a multipole of any number of rods—i.e. quadrupole, octapole, etc.

During the injection of ions into collision cell 68, the exit electrode is held at a trapping DC potential—that is the electrode between the hexapole of collision cell 68 and analyzer 58 is held at a DC potential substantially more repulsive to the ions than that applied to the hexpole of collision cell 68. After injection into collision cell 68, the ions lose kinetic energy via collisions with gas in collision cell 68 and may form fragment ions or other product ions.

The ions are then ejected from collision cell 68 into analyzer 58 along path 72. To eject the ions from collision cell 68, the DC potential on the exit electrode is made more attractive to the ions than that on the hexapole of collision cell 68. The potential on collision cell 68 is also held at a more repulsive potential than that on the entrance of analyzer 58. The potential difference between collision cell 68 and analyzer 58 accelerates the ions along path 72 into analyzer 58. In analyzer 58, the ions are mass analyzed and detected so as to form a mass spectrum. Mass analyzer 58 may be any known type of mass analyzer including but not limited to a Fourier transform ion cyclotron (FTICR) mass analyzer, a time of flight (TOF) mass analyzer, a quadrupole mass analyzer, a magnetic or electric sector mass analyzer, a Paul trap, or an Orbitrap.

Figure 7:
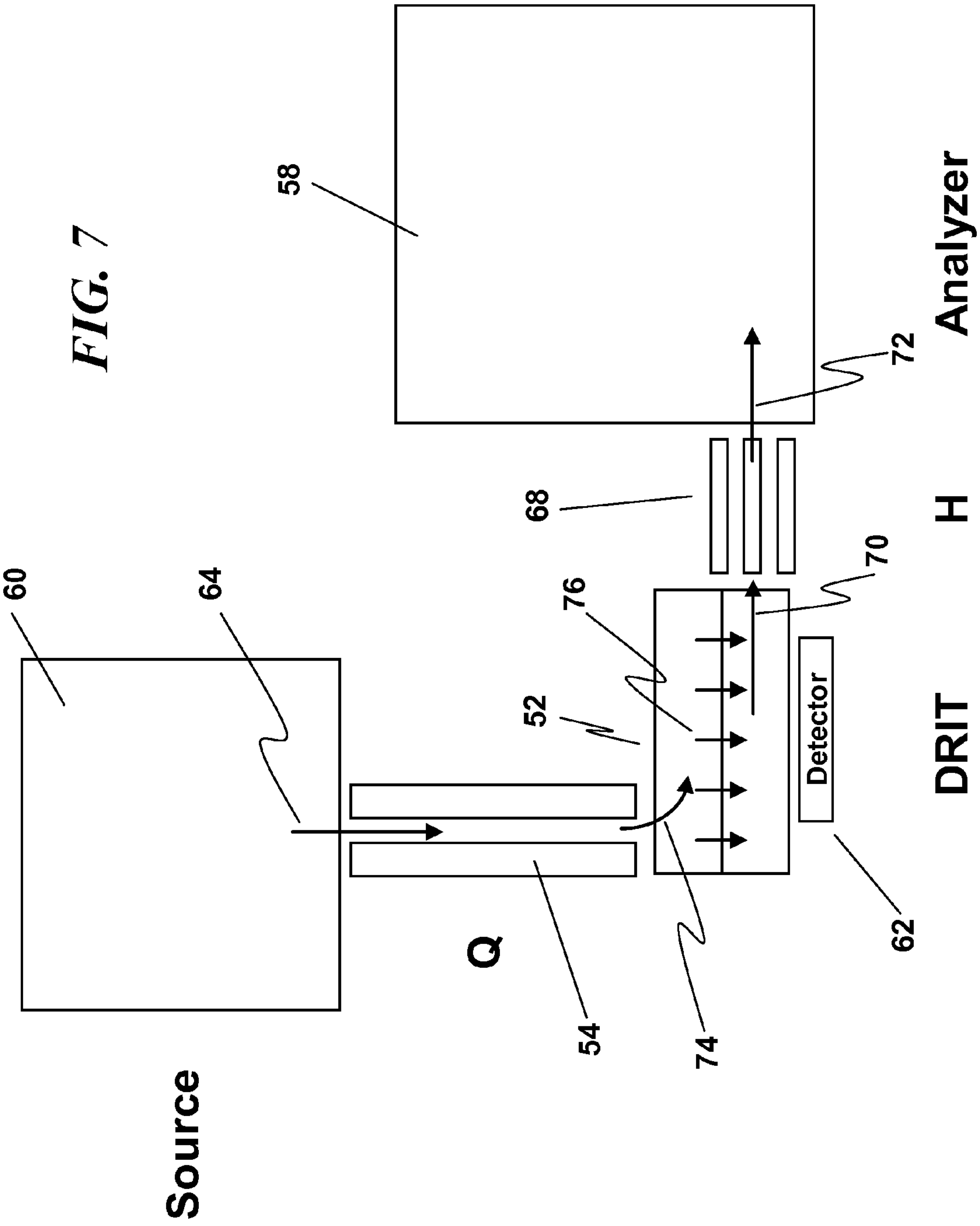
FIG. 7 depicts an alternate embodiment mass spectrometer incorporating a rectilinear ion trap according to the present invention.

In an alternate embodiment instrument as depicted in FIG. 7, source 60 and quadrupole 54 are oriented orthogonal to DRIT 52. The operation of the instrument of FIG. 7 is similar to that of the instrument of FIG. 6, except that ions follow path 74 between quadrupole 54 and DRIT 52 and enter DRIT 52 via slot 39. As described above ions are injected into trap 52 via slot 39 with enough kinetic energy to overcome the pseudopotential barrier at slot 39. The ions undergo collisions with gas in trap 52, lose kinetic energy, and become trapped in the pseudopotential well about axis 48. As discussed above selected ions are transferred along path 76 into the pseudopotential well about axis 50, manipulated according to the desired experiment, transferred to collision cell 68, and finally to analyzer 58.

Figures 8A, 8B, 8C:
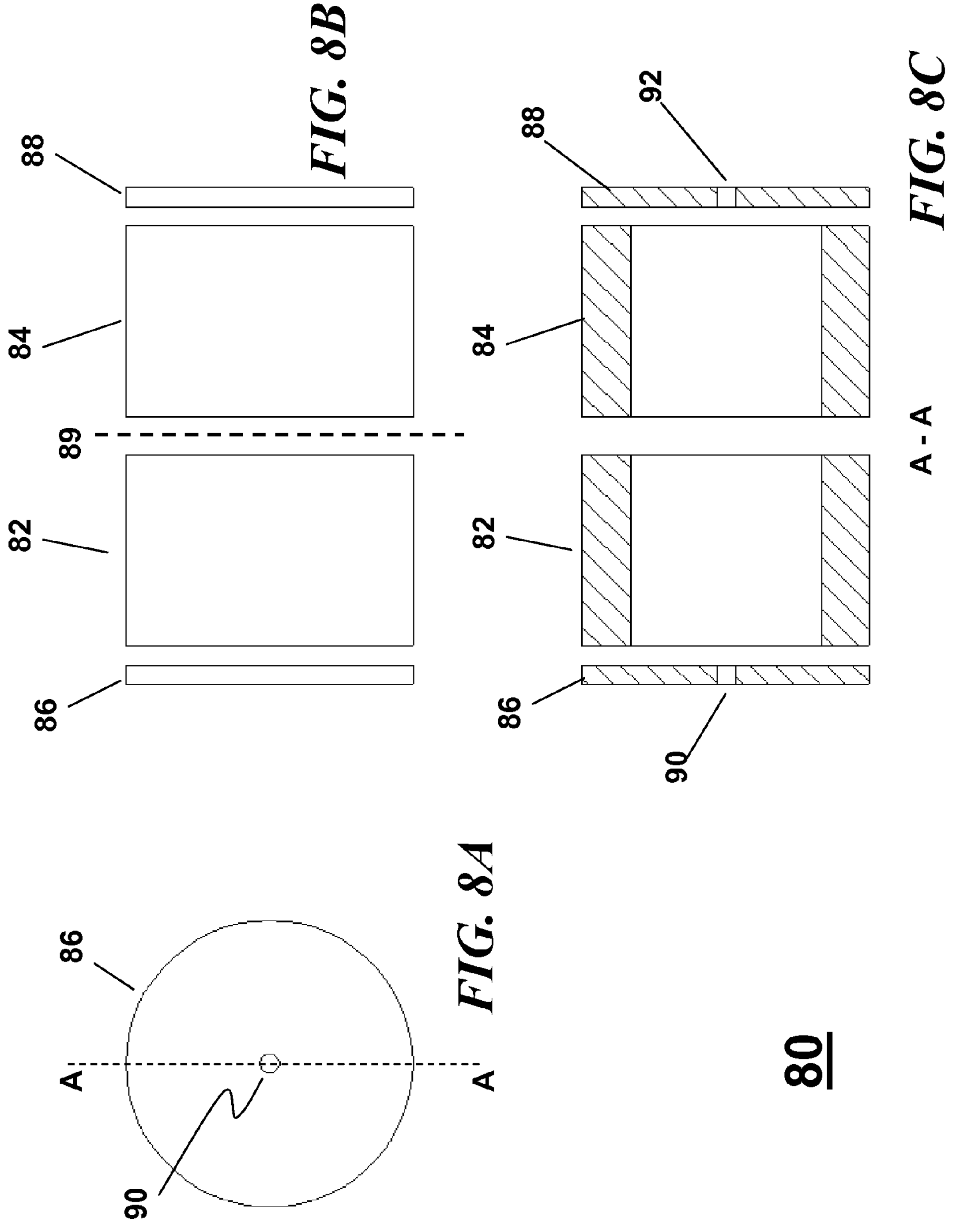
FIG. 8A is an end view of a cylindrical ion trap according to the present invention having two adjacent pseudopotential wells.
FIG. 8B is a side view of a cylindrical ion trap according to the present invention having two adjacent pseudopotential wells.
FIG. 8C is a cross sectional view of a cylindrical ion trap according to the present invention having two adjacent pseudopotential wells.

FIG. 8 depicts a dual cylindrical ion trap (DCIT) according to the present invention. FIG. 8A is an end view of the DCIT. FIG. 8B is a side view of the DCIT. And FIG. 8C is a cross sectional view of the DCIT according to the present invention taken at line A-A in FIG. 8A. As depicted in FIG. 8, DCIT 80 consists of two adjacent identical cylinders 82 and 84 and two endplate electrodes 86 and 88. All elements 82, 84, 86, and 88 are electrically conducting, cylindrically symmetric, and positioned on a common axis. Endplate electrodes 86 and 88 include apertures 90 and 92 through which ions may pass so as to enter or exit trap 80. The gap between adjacent cylinder electrodes 82 and 84 is twice the gap between cylinders 82 and 84 and adjacent endplate electrodes 86 and 88 respectively. In alternate embodiments the gap between adjacent electrodes 82, 84, 86, and 88 may be any suitable distance.

Electrodes of any desired dimension and placement may be used to construct DCIT 80, however, as an example, the inner diameter and outer diameter of electrodes 82 and 84 is 10 mm and 19 mm respectively. The length of electrodes 82 and 84 along their axis of symmetry is 7.4 mm. The gap between electrodes 82 and 84 is 3.2 mm. The gap between electrodes 82 and 86 and between 84 and 88 is 1.6 mm. The thickness of electrodes 86 and 88 is 0.5 mm. And the diameter of apertures 90 and 92 is 1 mm. In alternate embodiments, cylindrical electrodes 82 and 84 may have curved inner surfaces that may approximate round or hyperbolic surfaces.

In order to establish pseudopotential wells about the center of cylinders 82 and 84 and thereby confine ions in trap 80, an RF potential is applied between electrodes 82 and 84. In the preferred method of operation, the RF potential has two phases separated by 180°. Both phases have the same amplitude and frequency. The function, amplitude, and frequency of the RF potential may be any desired function, amplitude, and frequency, however, as an example, the RF potential may be sinusoidal having an amplitude of 1 $kV_{pp}$, and a frequency of 1 MHz. Electrode 82 has a first phase of the RF potential applied to it whereas electrode 84 has a second phase—i.e. 180° away from the first phase—of the RF potential applied to it. Electrodes 86 and 88 are held at ground potential.

Applying RF potentials as described above produces an electric field in trap 80 that is quadrupolar near the center of both electrodes 82 and 84. That is, if the origin of a Cartesian coordinate system is taken to be at the center of one of electrodes 82 or 84, then the potential near that point will take the form $A(r^2-2z^2)+B$, where A and B are constants, z is along the axis of symmetry and r is the distance from the axis of symmetry. Notice that the potential at center plane 89 is 0V even though there is no electrode at this position. Each of the quadrupolar field regions are thus bound on two sides by a ground plane and on two sides by RF electrodes.

Trap 80 is operated at a pressure such that ions in trap 80 may be cooled via collisions with gas. Any pressure of any type of gas may be used in conjunction with trap 80, however, as an example, trap 80 may be maintained at a pressure of greater than about 5E-4 mbar and less than about 1E-2 mbar of nitrogen.

Ions may be formed in trap 80 by, for example, laser ionization of analyte gas introduced into trap 80. Alternatively, analyte ions may be injected into trap 80 from an external ion source. Electrodes 86 and 88 include apertures 90 and 92 (see cross sectional view of FIG. 8C) respectively through which ions may enter and exit trap 80. Ions from an external ion source are accelerated to a kinetic energy sufficient to overcome the pseudopotential barrier formed by the above mentioned RF potential. The ions then pass through aperture 90 and into the pseudopotential well around the center of electrode 82. In order to be trapped in the pseudopotential well, the kinetic energy of the ions must then be reduced via collisions with the gas in trap 80. The gas in trap 80 is therefore ideally maintained at a pressure high enough that the ions have a high probability of undergoing at least one collision in the time necessary for the ion to pass through the pseudopotential well along the z axis. As discussed above, this is typically a pressure of 5E-4 mbar or higher.

Ions may alternatively enter trap 80 via aperture 92 in electrode 88. In such a case the ions would first encounter the pseudopotential well about the center of electrode 84. Ions entering trap 80 through aperture 92 will undergo collisions with the gas in trap 80. With each collision, the ions will lose kinetic energy. If the ions have enough collisions in their first passage between aperture 92 and center plane 89, they will have insufficient energy to overcome the pseudopotential barrier between the center of electrode 82 and 84 and will be trapped in the well about the center of electrode 84. Alternatively, if the kinetic energy of ions entering through aperture 92 is high or if the pressure of gas in the trap 80 is relatively low, then the ions may not lose enough energy in their first pass between aperture 92 and plane 89 and may therefore pass into the well about the center of electrode 82. In such a case analyte ions may be distributed between and trapped in both the pseudopotential well about the center of electrode 82 and that about the center of electrode 84.

Once ions are trapped in a pseudopotential well, they may be manipulated in various previously unavailable, sophisticated ways. Importantly, ions can be transferred without losses, in a selective or unselective manner, back and forth between the pseudopotential wells. Notice in FIG. 8 that there is no physical obstruction between the pseudopotential wells about the centers of electrodes 82 and 84. That is, there is nothing between the wells for the ions to collide with.

Any type of experiment known in the prior art that can be performed in an ion trap can also be performed in conjunction with the present invention. Such experiments include but are not limited to mass analysis by a resonance ejection scan or a mass selective instability scan, resonance excitation, isolation, CID, IRMPD, ETD, and any other fragmentation experiments, ion-molecule reactions, ion-ion reactions, and tandem MS experiments.

As with prior art traps, a mass selective instability scan is performed by ramping the RF amplitude applied to electrodes 82 and 84 and detecting ions that exit one or both of apertures 86 and 88 as a function of RF amplitude. As with prior art traps, the RF is ramped from low to high amplitude and the ions detected are initially of low m/z and are higher m/z as the RF amplitude is increased. The same principles of physics, equations of motion, calibration function, etc. used with prior art cylindrical ion traps may be applied to the present invention.

A resonance ejection scan in conjunction with the present invention is also performed in much the same manner as with a prior art trap. As the RF amplitude is increased an AC potential is applied between electrodes 86 and 88 in much the same manner as the AC potential is applied to the end caps of a prior art Paul trap. The AC potential is applied at a fixed frequency such that as the RF amplitude is increased, ions of successively higher m/z come into resonance with the AC potential. When the ions come into resonance with the AC potential they pick up energy from the AC potential and are ejected from trap 80 through apertures 90 and/or 92.

For the purpose of isolation, mass selective stability experiments may be performed. By applying an appropriate RF and DC potentials to the elements of trap 80, ions of all but a selected m/z or m/z range can be ejected from trap 80. A mass selective stability experiment may be performed, for example, by applying the appropriate RF and DC potentials between electrodes 82 and 84. As described above a first phase of RF is applied to electrode 82 whereas a second phase separated from the first by 180° is applied to electrode 84. In a mass selective stability experiment, the DC is applied in a similar manner—i.e. a DC potential of a first polarity is applied to electrode 82 and a DC potential of the opposite polarity but the same magnitude is applied to electrode 84. The required RF amplitude and DC potentials can be predicted in the same manner and using the same equations as in prior art traps.

Notice that if all analyte ions start in a single pseudopotential well, then the selected analyte ions will remain in that well after the mass selective stability experiment. All other ions will be ejected from trap 80—i.e. they will reside in neither pseudopotential well. In alternative experiments, selected ions may be transferred from one pseudopotential well to another. In a resonance ejection experiment, for example, assuming all analyte ions start in one pseudopotential well, selected ions can be ejected from one well into the other well of trap 80 by applying the AC potential to only one of electrodes 86 or 88. In this experiment, a fixed RF amplitude is applied to trap 80. Assuming all ions start in the pseudopotential well about the center of electrode 82, an AC potential is applied to electrode 86. The frequency of the AC potential is chosen to be in resonance with the secular frequency of the ion of interest and of an amplitude sufficient to eject the ions of interest before collisional cooling can occur. The AC potential amplitude should also be chosen to be as low as possible so that the selectivity of the ejection is as high a possible. Ions of interest will be ejected from the pseudopotential well about the center of electrode 82. Some of these ions will be ejected towards the pseudopotential well around the center of electrode 84. Some of these ions will undergo collisions with gas, lose energy, and become trapped in the well around the center of electrode 84. The fraction of ions ejected towards the pseudopotential well around the center of electrode 84 can be increased by applying a repelling DC potential to electrode 86. Ions not excited by the AC potential will remain in the well around the center of electrode 82 and may be subjected to further manipulations and experiments.

The selected ions that are transferred by resonance excitation to the pseudopotential well around the center of electrode 84 may be further manipulated, fragmented, reacted, and otherwise analyzed. To perform a CID experiment on the selected analyte ions, for example, a low amplitude AC potential may be applied to electrode 88. The AC potential is applied at the resonant frequency of the ion of interest such that the ions gain kinetic energy from the AC potential. An RF amplitude corresponding to a q of greater than about 0.6 can be beneficial during the CID experiment, because it allows for the trapping of more highly excited precursor ions. Through collisions with gas while under the influence of the AC potential, the selected ions are activated towards dissociation. Some of the dissociation products are ionized and can be further analyzed. These fragment ions can be mass analyzed directly by, for example, a resonance ejection scan in trap 80.

Once the ions of interested have been fully analyzed and ejected from trap 80, one or more of the ion types remaining in the pseudopotential well about the center of electrode 82 may be selected by resonance ejection and thereby transferred to the well about the center of electrode 84. The above set of experiments may then be performed on this second set of ions of interest. This process may be repeated as many times as desired or until all of the original set of analyte ions trapped in the well about the center of electrode 82 have been consumed.

To perform a resonance ejection scan of the fragment and remaining precursor ions in the well about the center of electrode 84 without disturbing the ions remaining in the well about the center of electrode 82, the AC potential is applied to electrode 88 at a frequency corresponding to a relatively low q. As the RF amplitude increased, ions will be ejected from the well around the center of electrode 84 but not from the well around the center of electrode 82 because the ions in the well around the center of electrode 82 do not experience the AC potential applied to electrode 88. The frequency of the AC potential is chosen such that the fragment ions of interest are ejected before the ions in the well about the center of electrode 82 become unstable due to the RF ramp.

As alternatives to CID other fragmentation may be used to form fragment ions from precursor ions of interest. Such methods include IR multiphoton dissociation (IRMPD), electron capture dissociation (ECD), electron transfer dissociation (ETD), or any other known method of fragmenting ions. To perform ETD, for example, one need only introduce ETD reagent ions into the well about the center of electrode 84 with the ions of interest. The pseudopotential barrier will simultaneously hold both the positively charged analyte ions of interest and the negatively charged ETD reagent ions in the well about the center of electrode 84. As the analyte and reagent ions mix, they will react and form fragments from the analyte ions. ETD reagent ions can be introduced into trap 80 through apertures 90 or 92 in the same manner as described above with respect to the introduction of analyte ions.

In an alternative experiment, one might inject multiply charged positive analyte ions into the pseudopotential well about the center of electrode 82 and negatively charged reagent ions in the well about the center of electrode 84. Once the wells are filled with a selected number of ions, the reagent ions are transferred to the analyte well. The transfer may be achieved by resonance ejection from the well about the center of electrode 84 or a repulsive DC potential might be applied to electrodes 84 and 88 sufficient to push the reagent ions out of the well about the center of electrode 84. Products of the ion-ion reaction can be analyzed directly in DCIT 80 or the products may be transferred mass unselectively to a downstream analyzer. The downstream mass analyzer may be of any known type including FTICR, TOF, or quadrupole mass analyzer. Alternatively, all analyte component ions are trapped in a first well and reagent ions in a second. Then, as described above, only selected analyte precursor ions are resonantly ejected from the first well into the second, while all remaining analyte ions are retained in the first well.

Figure 9:
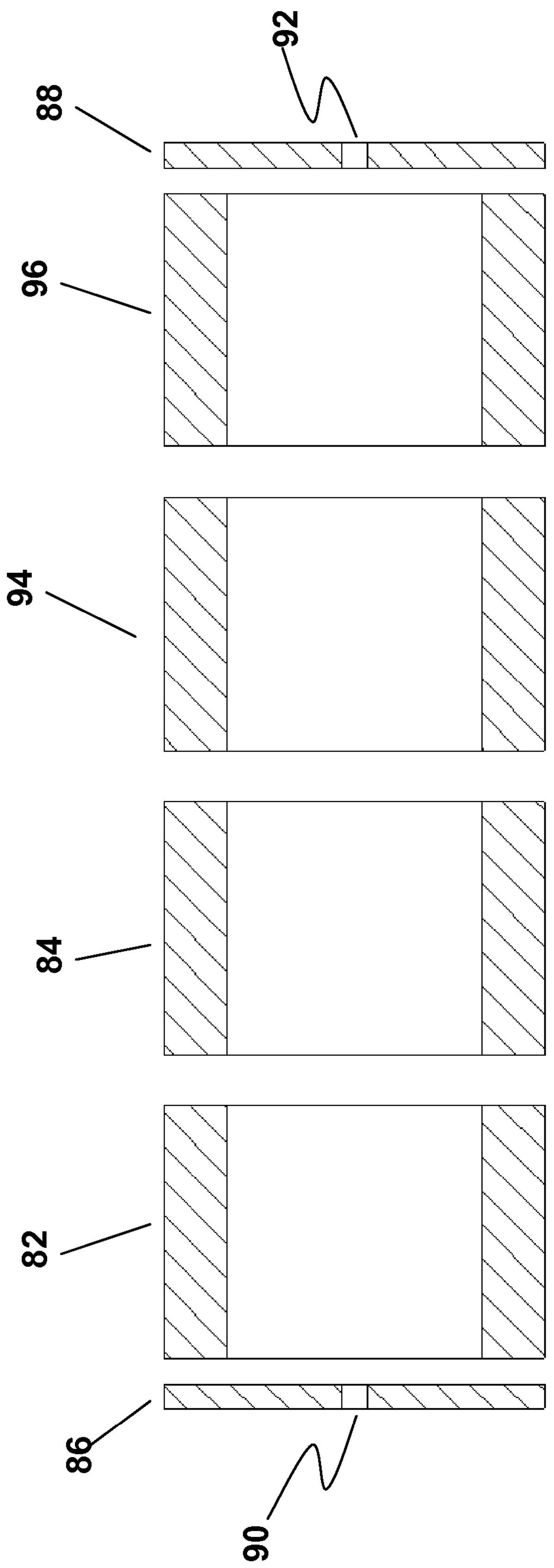
FIG. 9 depicts a cylindrical ion trap having four adjacent pseudopotential wells.

In the alternate embodiment of FIG. 9, additional ring electrodes 94 and 96 have been added so as to form a trap capable of four pseudopotential wells. Electrodes 94 and 96 are substantially identical in dimension and composition to electrodes 82 and 84. All electrodes 86, 82, 84, 94, 96, and 88 are cylindrically symmetric and centered on a common axis. Electrodes 82, 84, 94, and 96 are equally spaced along their common axis.

In alternate embodiments, electrodes of any desired dimension and placement may be used, however, as an example, the inner diameter and outer diameter of electrodes 82, 84, 94, and 96 is 10 mm and 19 mm respectively. The length of electrodes 82, 84, 94, and 96 along their axis of symmetry is 7.4 mm. The gap between adjacent electrodes 82, 84, 94, and 96 is 3.2 mm. The gap between electrodes 82 and 86 and between 96 and 88 is 1.6 mm. The thickness of electrodes 86 and 88 is 0.5 mm. And the diameter of apertures 90 and 92 is 1 mm. In alternate embodiments cylindrical electrodes 82, 84, 94, and 96 may have curved inner surfaces that may approximate round or hyperbolic surfaces.

In order to establish pseudopotential wells about the center of cylinders 82, 84, 94, and 96 and thereby confine ions in trap 98, an RF potential is applied between electrodes 82, 84, 94, and 96. In the preferred method of operation, the RF potential has two phases separated by 180°. Both phases have the same amplitude and frequency. The function, amplitude, and frequency of the RF potential may be any desired function, amplitude, and frequency, however, as an example, the RF potential may be sinusoidal having an amplitude of 1 $kV_{pp}$, and a frequency of 1 MHz. Electrodes 82 and 94 have a first phase of the RF potential applied to them whereas electrodes 84 and 96 have a second phase—i.e. 180° away from the first phase—of the RF potential applied to them. Electrodes 86 and 88 are held at ground potential.

The operation of quadruple cylindrical ion trap 98 is substantially the same as described above with respect to trap 80. However, as depicted in FIG. 9, cylindrical ion trap 98 consists of four cylindrical electrodes 82, 84, 94, and 96, each of which will have a pseudopotential well at its geometric center. Ions may be transferred between adjacent pseudopotential wells, manipulated, and mass analyzed as described above with respect to trap 80. In alternate embodiments any number of cylindrical electrodes may be used in such a trapping arrangement to produce a trap having any desired number of pseudopotential wells. To drive the trap, the RF applied to any given cylindrical electrode is 180° out of phase with that applied to adjacent cylindrical electrodes.

In alternate embodiments interstitial electrodes may be placed between adjacent cylindrical electrodes. The interstitial electrodes would be held at a ground potential. The interstitial electrodes may be planar electrodes having apertures aligned with the axis of symmetry of the trap. Alternatively, the interstitial electrodes may be composed of electrically conducting mesh.

Similarly, in alternate embodiments, dual rectilinear ion traps 20 and 52 may be extended to include as many pseudopotential wells as desired. Additional electrodes having the same dimensions as electrodes 32 and 40 are spaced equally along the x-axis adjacent to and in the same plane as electrodes 32 and 40. The RF applied to any given electrode is 180° out of phase with that applied to adjacent electrodes along the x-axis. The RF applied to any given electrode has the same phase as that applied to adjacent electrodes along the y-axis. Interstitial electrodes may also be placed between adjacent sets of RF electrodes and may be used in the manipulation of ions as described above.

Figure 10:
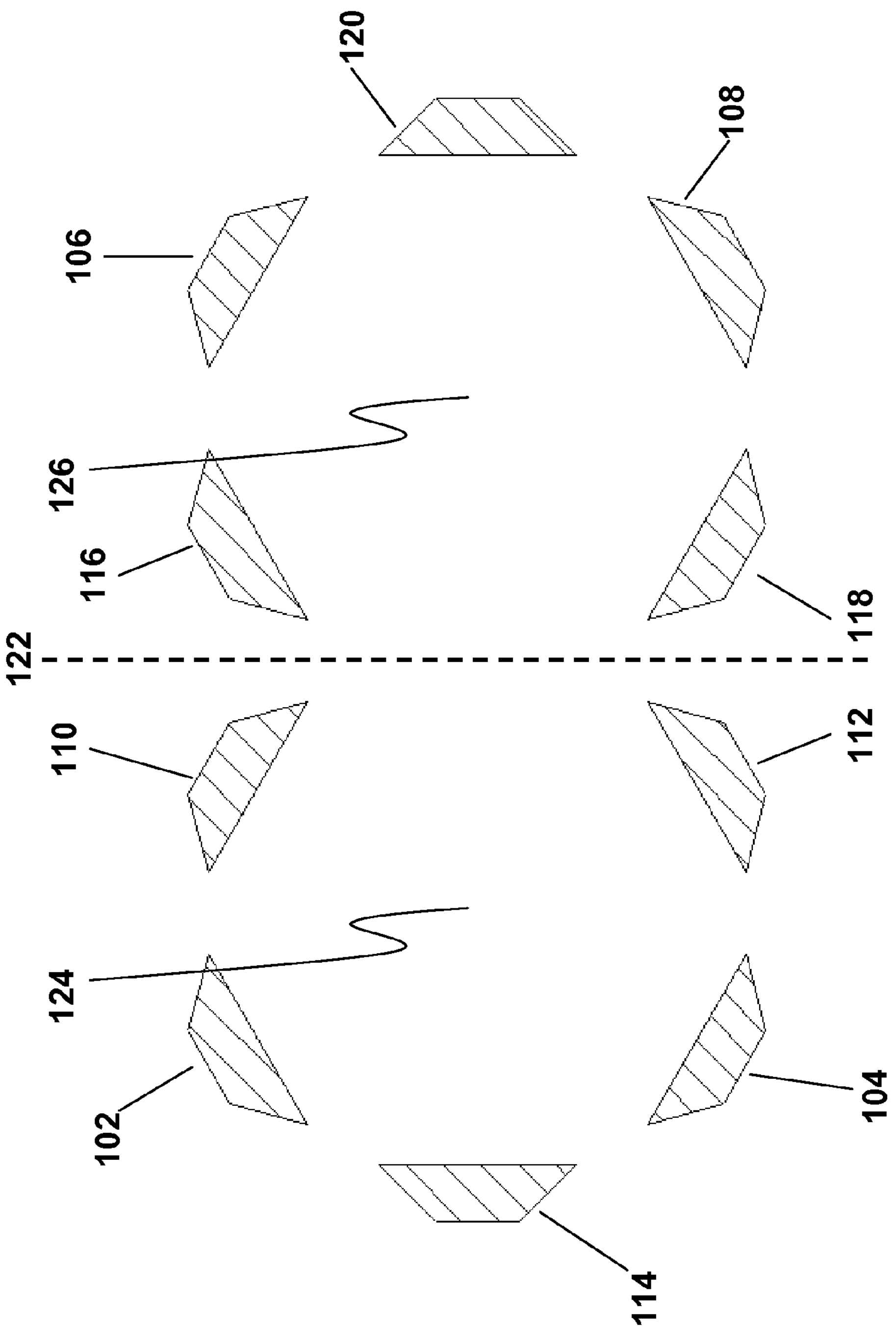
FIG. 10 is a cross sectional view of a hexapolar linear ion trap having two adjacent pseudopotential wells.

FIG. 10 is a cross sectional view of a dual hexapole linear ion trap 100 according to the present invention. As depicted in FIG. 10, dual hexpole linear ion trap 100 consists of ten electrically conducting rods 102, 104, 106, 108, 110, 112, 114, 116, 118, and 120 equally spaced, and symmetrically centered about two axes 124 and 126. Similar to dual rectilinear ion trap 20, rods 102-120 extend parallel to axes 124 and 126 into and out of the page. The surface of rods 102-120 facing axes 124 and 126 is planar and normal to a line extending from the axis about which they are centered. The distance between axis 124 and then inner surface of electrodes 114 is the same as the distance between axis 124 and central plane 122. Similarly, the distance between axis 126 and the inner surface of electrodes 120 is the same as the distance between axis 126 and central plane 122.

In alternate embodiments, electrodes of any desired dimension and placement may be used, however, as an example, the distance between axis 124 and the midpoint of the inner surface electrodes 102, 104, 110, 112, and 114—i.e. the inner radius of the hexapole formed around axis 124—is 2.5 mm. Similarly, the distance between axis 126 and the midpoint of the inner surface electrodes 106, 108, 116, 118, and 120—i.e. the inner radius of the hexapole formed around axis 126—is also 2.5 mm. The width of the inner surface of electrodes 102-120 is 2 mm and their length along axis 124 is 100 mm.

In order to establish pseudopotential wells about axes 124 and 126 and thereby confine ions in trap 100, an RF potential is applied between electrodes 102-120. In the preferred method of operation, the RF potential has two phases separated by 180°. Both phases have the same amplitude and frequency. The function, amplitude, and frequency of the RF potential may be any desired function, amplitude, and frequency, however, as an example, the RF potential may be sinusoidal having an amplitude of 600 $V_{pp}$, and a frequency of 2 MHz. Electrodes 110, 112, and 114 have a first phase of the RF potential applied to them whereas electrodes 116, 118, and 120 have a second phase—i.e. 180° away from the first phase—of the RF potential applied to them. Electrodes 102, 104, 106, 108 are held at ground potential. In alternate embodiments interstitial electrodes may be placed at plane 122 in a similar manner as described above with respect to traps 52 and 80.

In alternate embodiments the concepts presented above may be extended to higher order linear or cylindrical trapping devices—i.e. hexapole, octapole, dodecapole, etc.

While the present invention has been described with reference to one or more preferred and alternate embodiments, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. An apparatus for manipulating ions comprising:

a plurality of electrodes centered on at least two parallel and non-collinear axes; and a generator that applies an RF potential between pairs of the plurality of electrodes to form a pseudopotential well about each of the axes wherein the electrodes are distributed about the axes and RF potentials are applied so that substantially no physical obstruction blocks a passage of ions from one pseudopotential well to another pseudopotential well.

2. The apparatus of claim 1 wherein each of the plurality of electrodes is substantially planar.

3. The apparatus of claim 1 wherein the plurality of electrodes are distributed about the axes and the generator applies an RF potential between pairs of the plurality of electrodes to form a quadrupolar pseudopotential well about each of the axes.

4. The apparatus of claim 1 wherein the plurality of electrodes are distributed about said axes and the generator applies an RF potential between pairs of the plurality of electrodes to form one of a hexapolar, octapolar, and higher order pseudopotential well about each of the axes.

5. The apparatus of claim 1 further including interstitial electrodes positioned between said axes.

6. The apparatus of claim 5 wherein said interstitial electrodes are formed from an electrically conducting mesh.

7. The apparatus of claim 1 wherein the plurality of electrodes is distributed about the axes in a manner such that substantially no physical obstruction blocks a passage of ions from one pseudopotential well to another pseudopotential well.

8. The apparatus of claim 7 wherein the plurality of electrodes are distributed about the axes and the generator applies an RF potential between pairs of the plurality of electrodes to form a quadrupolar pseudopotential well about each of the axes.

9. The apparatus of claim 7 wherein the plurality of electrodes are distributed about said axes and the generator applies an RF potential between pairs of the plurality of electrodes to form one of a hexapolar, octapolar, and higher order pseudopotential well about each of the axes.

10. The apparatus of claim 7 further including interstitial electrodes positioned between the axes.

11. The apparatus of claim 10 wherein said interstitial electrodes are formed from an electrically conducting mesh.

12. An apparatus for manipulating ions comprising:

a plurality of cylindrical electrodes centered on a common axis, each cylindrical electrode having a center position;

two end plate electrodes, each electrode having an aperture therethrough centered on the common axis and one electrode being positioned at each end of said plurality of cylindrical electrodes; and an RF generator that applies an RF potential between said pairs of the plurality of cylindrical electrodes to form a pseudopotential well at the center position of each cylindrical electrode wherein the RF potentials are applied so that substantially no physical obstruction blocks a passage of ions from one pseudopotential well to another pseudopotential well.

13. The apparatus of claim 12 wherein each of the plurality of cylindrical electrodes has a substantially circular or hyperbolic inner surface.

14. The apparatus of claim 12 further including interstitial electrodes positioned between said cylindrical electrodes.

15. The apparatus of claim 14 wherein said interstitial electrodes are formed from an electrically conducting mesh.

16. A mass spectrometer comprising:

an ion source for generating ions;

an ion trap having a plurality of planar electrodes centered on at least two parallel and non-collinear axes and an RF generator that applies an RF potential between pairs of the plurality of electrodes to form a pseudopotential well about each of the axes wherein the electrodes are distributed about the axes and RF potentials are applied so that substantially no physical obstruction blocks a passage of ions from one pseudopotential well to another pseudopotential well; and an ion detector.

17. The mass spectrometer of claim 16 further comprising a quadrupole filter positioned in an ion path between the ion source and the ion trap.

18. The mass spectrometer of claim 16 further comprising a mass analyzer selected from a group consisting of a quadrupole mass analyzer, a Paul trap mass analyzer, a time of flight mass analyzer, an ion cyclotron mass analyzer, and an Orbitrap mass analyzer.

19. The mass spectrometer of claim 18 further comprising a quadrupole filter positioned between in an ion path between the ion source and the ion trap.

20. The mass spectrometer of claim 19 further comprising a collision cell.

* * * * *